US008889812B2

(12) United States Patent
Albert et al.

(10) Patent No.: US 8,889,812 B2
(45) Date of Patent: Nov. 18, 2014

(54) AQUEOUS SILANE SYSTEMS BASED ON TRIS(ALKOXYSILYLALKYL)AMINES AND THE USE THEREOF

(75) Inventors: Philipp Albert, Lörrach (DE); Eckhard Just, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 155 days.

(21) Appl. No.: 13/258,724

(22) PCT Filed: Mar. 19, 2010

(86) PCT No.: PCT/EP2010/053622
§ 371 (c)(1),
(2), (4) Date: Oct. 24, 2011

(87) PCT Pub. No.: WO2010/121872
PCT Pub. Date: Oct. 28, 2010

(65) Prior Publication Data
US 2012/0031302 A1 Feb. 9, 2012

(30) Foreign Application Priority Data

Apr. 20, 2009 (DE) .................. 10 2009 017 822

(51) Int. Cl.
| | |
|---|---|
| C08G 77/26 | (2006.01) |
| C23C 18/12 | (2006.01) |
| C09D 183/08 | (2006.01) |
| C09D 5/00 | (2006.01) |
| C09D 7/12 | (2006.01) |
| C09D 183/10 | (2006.01) |
| C08G 77/452 | (2006.01) |
| C23C 22/74 | (2006.01) |
| C09D 5/14 | (2006.01) |
| C09D 5/08 | (2006.01) |
| C23C 22/83 | (2006.01) |

(52) U.S. Cl.
CPC .............. *C09D 5/08* (2013.01); *C23C 18/1254* (2013.01); *C09D 183/08* (2013.01); *C09D 5/002* (2013.01); *C23C 18/122* (2013.01); *C23C 18/1245* (2013.01); *C09D 7/1233* (2013.01); *C23C 18/1208* (2013.01); *C09D 183/10* (2013.01); *C08G 77/452* (2013.01); *C08G 77/26* (2013.01); *C23C 22/74* (2013.01); *C09D 5/14* (2013.01); *C23C 2222/20* (2013.01); *C23C 22/83* (2013.01)
USPC ........................................................ 528/38

(58) Field of Classification Search
USPC ........................................................ 528/38
See application file for complete search history.

(56) References Cited

U.S. PATENT DOCUMENTS

| | | |
|---|---|---|
| 5,629,400 A | 5/1997 | Standke et al. |
| 5,679,147 A | 10/1997 | Standke et al. |
| 5,808,125 A | 9/1998 | Standke et al. |
| 5,849,942 A | 12/1998 | Standke et al. |
| 5,863,509 A | 1/1999 | Standke et al. |
| 5,885,341 A | 3/1999 | Standke et al. |
| 6,054,601 A | 4/2000 | Standke et al. |
| 6,177,582 B1 | 1/2001 | Jenkner et al. |
| 6,228,936 B1 | 5/2001 | Standke et al. |
| 6,251,989 B1 | 6/2001 | Edelmann et al. |
| 6,255,513 B1 | 7/2001 | Standke et al. |
| 6,288,256 B1 | 9/2001 | Standke et al. |
| 6,491,838 B1 | 12/2002 | Standke et al. |
| 6,641,870 B2 | 11/2003 | Bartkowiak et al. |
| 6,685,766 B2 | 2/2004 | Standke et al. |
| 6,713,186 B1 | 3/2004 | Jenkner et al. |
| 7,177,582 B2 | 2/2007 | Ohta et al. |
| 7,427,442 B2 | 9/2008 | Albert et al. |
| 7,578,877 B2 | 8/2009 | Giessler et al. |
| 7,598,409 B2 | 10/2009 | Just et al. |
| 7,611,753 B2 | 11/2009 | Bartkowiak et al. |
| 7,666,257 B2 | 2/2010 | Giessler-Blank et al. |
| 7,670,422 B2 | 3/2010 | Giessler-Blank et al. |
| 7,781,520 B2 | 8/2010 | Standke et al. |
| 8,039,110 B2 | 10/2011 | Jenkner et al. |
| 8,101,682 B2 | 1/2012 | Standke |
| 8,119,730 B2 | 2/2012 | Edelmann et al. |
| 8,147,918 B2 | 4/2012 | Standke et al. |
| 8,188,266 B2 | 5/2012 | Edelmann et al. |
| 2007/0054056 A1 | 3/2007 | Albert et al. |
| 2007/0110912 A1 | 5/2007 | Standke |
| 2008/0058489 A1 | 3/2008 | Edelmann et al. |
| 2008/0081120 A1 | 4/2008 | Van Ooij et al. |
| 2008/0187673 A1 | 8/2008 | Standke et al. |

(Continued)

FOREIGN PATENT DOCUMENTS

| | | | |
|---|---|---|---|
| CN | 101376792 | * | 3/2009 |
| WO | 2005 014741 | | 2/2005 |
| WO | WO2005/014741 | | 2/2005 |
| WO | WO2009/037013 | | 3/2009 |

OTHER PUBLICATIONS

U.S. Appl. No. 13/638,702, filed Oct. 25, 2012, Friedel, et al.
U.S. Appl. No. 13/638,733, filed Oct. 1, 2012, Friedel, et al.
U.S. Appl. No. 13/368,734, filed Oct. 1, 2012, Friedel, et al.
U.S. Appl. No. 13/640,638, filed Oct. 11, 2012, Friedel, et al.
U.S. Appl. No. 13/638,619, filed Oct. 1, 2012, Friedel, et al.
U.S. Appl. No. 12/674,271, filed Feb. 19, 2010, Albert, et al.

(Continued)

*Primary Examiner* — Kuo-Liang Peng
(74) *Attorney, Agent, or Firm* — Oblon, Spivak, McClelland, Maier & Neustadt, L.L.P.

(57) ABSTRACT

The invention relates to an aqueous composition based on tris-silylated amino-functional silicon compounds, which is substantially free of organic solvents and which substantially does not release any alcohol even during the cross-linking process, and to method for the production thereof, and to the use thereof, for example for the hydrophobization of metal, glass or mineral surfaces, such as concrete and bricks, as adhesion promoter or for rock consolidation, among other things.

13 Claims, No Drawings

(56) References Cited

U.S. PATENT DOCUMENTS

| | | |
|---|---|---|
| 2008/0206572 A1 | 8/2008 | Edelmann et al. |
| 2009/0005518 A1 | 1/2009 | Just et al. |
| 2009/0007818 A1 | 1/2009 | Militz et al. |
| 2009/0264574 A1 | 10/2009 | Van Ooij et al. |
| 2010/0119851 A1 | 5/2010 | Giessler-Blank et al. |
| 2010/0159144 A1 | 6/2010 | Standke et al. |
| 2010/0191001 A1 | 7/2010 | Wassmer et al. |
| 2010/0209719 A1 | 8/2010 | Borup et al. |
| 2011/0124794 A1 | 5/2011 | Friedel et al. |
| 2011/0178238 A1 | 7/2011 | Koschabek et al. |
| 2011/0259240 A1 * | 10/2011 | Jenkner et al. ............ 106/287.11 |
| 2011/0308423 A1 | 12/2011 | Friedel et al. |

OTHER PUBLICATIONS

U.S. Appl. No. 12/674,601, filed Feb. 22, 2010, Jenker, et al.
U.S. Appl. No. 13/062,225, filed May 16, 2011, Weissenbach, et al.
U.S. Appl. No. 13/389,561, filed Feb. 8, 2012, Albert, et al.
U.S. Appl. No. 13/580,194, filed Aug. 21, 2012, Borup, et al.
U.S. Appl. No. 14/007,481, filed Sep. 25, 2013, Albert, et al.

* cited by examiner

AQUEOUS SILANE SYSTEMS BASED ON TRIS(ALKOXYSILYLALKYL)AMINES AND THE USE THEREOF

The invention relates to an aqueous composition based on tris-silylated amino-functional silicon compounds, which is essentially free of organic solvents and releases essentially no further alcohol even in the course of crosslinking, and to processes for preparation thereof and to the use thereof, for example, for hydrophobization of metal, glass or mineral surfaces, such as concrete and bricks, as an adhesion promoter, as a primer or else, inter alia, for rock consolidation.

There is also increasing interest in aqueous silane systems which comprise a low level or no organic solvent and are therefore more environmentally friendly. Frequently, these aqueous systems, however, are unstable over a prolonged period.

The preparation of water-soluble aminopolysiloxanes is described in EP 0 590 270 A2. The aminosilanes are admixed with a defined amount of water in a 50% alcoholic solution and partly hydrolysed. Disadvantages are the high content of organic solvents and the associated low flashpoint. A dilute aqueous polysiloxane mixture is cured at 80° C.

DE 103 35 178 A1 discloses the preparation of water-dilutable silane systems, for example a mixture of 3-aminopropyltrialkoxysilane and bis(trialkoxysilylpropyl)amine in alcoholic solvents. This silane mixture is partially hydrolysed with a defined molar amount of water. The silane mixture has an alcohol content of 25 to 99.99% and is not free of VOCs (volatile organic compounds).

U.S. Pat. No. 5,051,129 discloses a composition of an aqueous solution of a water-soluble aminosilane and of an alkyltrialkoxysilane. The preparation is effected by addition of a defined amount of water to the silane mixture and subsequent heating at 60° C. The silane mixture thus prepared is dissolved in a particular ratio in water and serves for hydrophobization of surfaces.

EP 0 716 128 A1 discloses water-based, organopolysiloxane-containing compositions, processes for preparation thereof and the use thereof. Mixing of water-soluble aminoalkylalkoxysilanes with alkyltrialkoxysilanes and/or dialkyldialkoxysilanes and addition of water at a defined pH gives rise to organopolysiloxane-containing compositions.

Aqueous silane systems comprising reaction products from the reaction of aminoalkyltrialkoxysilanes and bissilylaminosilanes are disclosed by EP 1 031 593 A2. These aqueous solutions based on the sole hydrolysis of bissilylaminosilanes are said to be unsuitable for application since they tend to gelate and flocculate.

WO 00/39177 A2 describes the use of bissilylaminosilanes and/or bissilylpolysulphanes in aqueous alcoholic solutions. The silanes are mixed with water, an alcohol and optionally acetic acid, and hydrolysed for at least 24 h. This is followed by application to metals.

U.S. Pat. No. 6,955,728 B1 describes the use of acetoxysilanes in combination with other silanes in aqueous solutions, and the use thereof on metals. Products recommended for sale are unhydrolysed concentrates in the form of a 2-component system or an anhydrous premixed concentrate, in order to prevent condensation of the silanes. The aqueous solutions always comprise the alcohol of hydrolysis after mixing.

DE 1008703 relates to a process for coating or sizing of glass fibres. For this purpose, an aminoalkoxysilane is applied to the glass fibre. This is done, for example, from an alcoholic solution with a water content of 0 to 60% by weight.

WO 2005/014741 A1 relates to aqueous alcoholic formulations based on reaction products of aminosilanes which also contain small amounts of tris(trialkoxysilylpropyl)amines. The formulations mentioned have an alcohol content of 25 to 99% by weight and are suitable for modification of glass fibres.

It was an object of the present invention to provide aqueous and essentially VOC-free and/or sol-gel-based compositions based on tris-silylated amino-functional alkoxysilanes which are useable in various ways, especially have corrosion-protecting and priming properties and crosslink even at low temperatures, and are substantially abrasion-resistant. A particular desire was the provision of layers and products producible therefrom.

The object is achieved according to the independent claims; preferred embodiments are detailed in the dependent claims and in the description.

It has been found that, surprisingly, stable aqueous, essentially alcohol-free compositions based on silicon compounds can be obtained from trisamino-functional alkoxysilanes, especially of the Formula IX, with organofunctional alkoxysilanes, especially with alkyl-functional alkoxysilanes, preferably of the formula VI, the silicon compounds being present in essentially completely hydrolysed form. It should additionally be emphasized that these compositions advantageously crosslink even at low temperatures.

It has thus been found in accordance with the invention that it is possible to produce, from tris(triethoxysilylpropyl)amine (tris-AMEO), stable, essentially VOC-free aqueous silane systems, also referred to hereinafter as composition, which possess particular properties. For example, an aqueous cocondensate formed from tris-AMEO and n-propyltrimethoxysilane (PTMO), on application to a glass plate, metal surface or other suitable substrate surface, after drying at room temperature, exhibits high stability and hydrophobicity. Compared to cocondensates based on bis(triethoxysilylpropyl)amine (bis-AMEO) or other silane systems, for example based on aminosilanes or pure alkylsilanes, the curing of tris-AMEO-based silane systems is considerably more rapid, which is particularly advantageous for a wide variety of different applications, especially for the coating of substrates. Furthermore, the coatings obtained are considerably more stable to aggressive chemical influences, such as boiling water, acidic environmental influences, mustard or else customary cleaning fluids.

Surprisingly, the inventive compositions which have been cured over the course of 12 hours at room temperature on a metal or glass surface are not detached in boiling water. The resulting cured layer remains essentially unchanged on the substrate. The cured coating obtained after 12 hours at room temperature is found to be stable even with respect to vinegar detergent, mustard and oven cleaner. It is assumed that this could be attributable to the possibility of stronger crosslinking with the substrate, without being bound to this theory.

Crosslinking is understood to mean the condensation of the silicon compounds with one another, and especially condensation with functionalities of substrates. As a result of this, and if appropriate as a result of interactions or reactions, for example complexation, of the amino functions of the silicon compounds with functionalities of substrates, stable layers resistant to boiling water form from the aqueous, essentially alcohol-free composition.

The invention provides a composition, also referred to hereinafter as silane system, comprising essentially water-soluble, tris-silylated amino-functional silicon compounds and water, especially as a sol-gel system or else as a solution, the silicon compounds being derived from alkoxysilanes (cf. also the alkoxysilanes or organoalkoxysilanes shown below, especially of the general Formulae II, IX, IV, VI, VII and VIII), and having crosslinking structural elements, especially with the A, Z, Y, C, D and/or E radicals, and with $R^1$, $R^3$, $R^5$, $R^7$, $R^8$, $R^{11}$ and/or $R^{12}$, as defined hereinafter, which form catenated, cyclic, crosslinked and/or three-dimensionally crosslinked structures, at least one structure in idealized form corresponding to the general formula I or Ia,

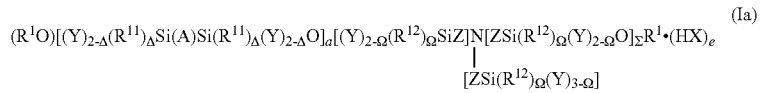

(Ia)

where, in the structural elements derived from alkoxysilanes
A is a bivalent aminoalkyl radical,
Z in the tris-silylated amine is independently a bivalent alkenyl radical,
Y is $OR^1$ or, in crosslinked and/or three-dimensionally crosslinked structures, independently $OR^1$ or $O_{1/2}$,
where $R^1$, especially in the formula Ia, is independently essentially hydrogen and $R^{11}$ and/or $R^{12}$ are each independently organofunctional radicals and
HX is an acid where X is an inorganic or organic acid radical,
where $0 \leq \Delta \leq 2$; $0 \leq \Omega \leq 2$; $a \geq 0$, preferably 1 to 12 000, more preferably 2 to 10 000, most preferably 3 to 5000, $\Sigma \geq 1$, preferably 2 to 15 000, more preferably 3 to 10 000, most preferably 4 to 6000, $e \geq 0$, preferably 1 up to the number of nitrogen atoms in the particular molecule, more preferably 2 to 10 000, even more preferably 3 to 8000, especially 4 to 5000, and $(a+\tau+e) \geq 1$, especially on average for $(a+\Sigma) \geq 2$ to 27 000 including all intermediate numbers,
the composition being essentially free of organic solvents and releasing essentially no further alcohol in the course of crosslinking, especially in the course of curing.

The invention also provides a composition, also referred to hereinafter as silane system, comprising essentially water-soluble, tris-silylated amino-functional silicon compounds, which are essentially free of alkoxy groups and wherein at least one of the amino groups in the silicon compound is tris-silylated, and water, especially as a sol-gel system or else as a solution.

The present silicon compounds, called tris-silylated amino-functional silicon compounds, are—expressed in another way—understood to mean amino compounds wherein at least one amino group having three silyl groups bonded to the nitrogen is present in one molecule. The silyl group in question is generally bonded to said nitrogen via a bivalent alkyl unit, for example —$CH_2$—, —$(CH_2)_2$—, —$(CH_2)_3$—, —$CH_2[CH(CH_3)]CH_2$—. In addition, said silyl groups may independently be the same or different and, as well as "Si—OH" and/or "Si—O—Si" units, optionally have further functionalities, especially organo functionalities, as can be inferred from the general Formulae I, Ia, II, IX, IV, VII and VIII which follow; see also Scheme I.

A said essentially water-soluble, tris-silylated, amino-functional silicon compound which is especially free of alkoxy groups is thus understood to mean a compound which is obtainable by hydrolysis and/or condensation, especially at least partial condensation, of a tris-silylated amino-functional alkoxysilane, especially of the formula IX, or the hydrolysis and/or condensation products thereof, under hydrolysis and/or condensation conditions, preparation being possible in an aqueous alcoholic phase and storage being possible in an essentially aqueous phase. Preference is given to hydrolysis and storage at pH values in the range from 1 to 6.

Equally, an essentially water-soluble, tris-silylated, amino-functional silicon compound which is especially free of alkoxy groups is understood to mean a compound which is obtainable by hydrolysis and/or condensation, especially at least partial condensation, of a tris-silylated amino-functional alkoxysilane, especially of the formula IX, or the hydrolysis and/or condensation products thereof, with further functional alkoxysilanes, especially of the Formulae II, III, IV, VI, VII and/or VIII, or the hydrolysis and/or condensation products or mixtures thereof, under hydrolysis and/or condensation conditions, preparation being possible in an aqueous alcoholic phase and storage being possible in an essentially aqueous phase. Preference is given to hydrolysis and storage at pH values in the range from 1 to 6.

For example, such cocondensates can be prepared from tris-AMEO/tris-AMMO and PTMO or with GLYMO or from tris-AMEO/tris-AMMO and AMEO, bis-AMEO, MEMO, VTMO, VTEO, Dynasylan® 1189, mercaptoalkylsilane, DAMO, TRIAMO, Dynasylan® 4144, Dynasylan A, alkyltrialkoxysilane, bis(trialkoxysilylalkyl)-polysulphane (for example Si69), bis(trialkoxysilylalkyl)disulphane (for example Si 266).

According to the invention, the sol-gel is derived indirectly or directly by hydrolysis and/or condensation of a tris-silylated aminoalkoxysilane of the formula IX and/or of a hydrolysis and/or condensate of this compound, optionally with further functional alkoxysilanes, such as those of the Formulae II, III, IV, VI, VII and/or VIII in particular, or at least two of the alkoxysilanes mentioned, or the hydrolysis and/or partial condensation products and/or cocondensates or else block cocondensates thereof. A sol-gel system is understood to be indirectly derived when it is prepared by reaction of trisamino-functional alkoxysilanes with silicon dioxide ($SiO_2$), and to be directly derived when the sol-gel system forms, especially exclusively, by condensation of the added alkoxysilanes.

A solution in the present document is understood to mean a homogeneous mixture of the silicon compound(s) and of the essentially aqueous phase of the composition.

The content of solvents, especially of free alcohol, in relation to the overall composition is preferably below 2% by weight, especially ≤1% by weight, more preferably less than or equal to 0.4% by weight, preferably less than or equal to 0.3% by weight. It is particularly preferable that, especially in the case of curing or of condensation, ≤1% by weight of alcohol, preferably less than or equal to 0.5% by weight, is released from the tris-silylated amino-functional silicon compound, especially of the formula Ia or I with $OR^1$ where $R^1$ is an alkyl radical having 1 to 4 carbon atoms; preferably, the tris-silylated amino-functional silicon compound, especially of the formula Ia and/or I, is present in essentially completely hydrolysed and at least partially condensed or cocondensed form or as a block cocondensate; more preferably, the content of free alcohols is less than or equal to 1% by weight, preferably less than or equal to 0.5% by weight, especially when the reaction product results from the reaction of silanes of the Formulae II, IX or IV or at least two of the compounds mentioned. The attainable flashpoint of more than 95° C. should likewise be emphasized. Solvents are considered to be alcohols, such as methanol, ethanol, propanol, butanol, or else customary organic solvents known to those skilled in the art, such as hydrocarbons, ketones or ethers.

The invention also provides compositions comprising essentially water-soluble and alkoxy group-free reaction products from the hydrolysis and/or condensation of compounds of the formula IX or IX and II or IX and IV or IX, II and IV, and the hydrolysis and/or condensation products thereof, and optionally an acid and the conjugated salts thereof and water, and optionally alcohol, the content of free alcohol being especially below 1% by weight in relation to the composition.

A composition essentially free of alkoxy groups and free of organic solvents, such as alcohol, is considered to be a composition with a ratio of silicon atoms in the silicon compound to free alcohol (HOR$^1$ where R$^1$ is an alkyl radical) or alkoxy groups in the silicon compound (—OR$^1$ where R$^1$ is an alkyl radical), especially in the general formula Ia or I, of less than 1:0.3, preferably 1:≤0.15; more preferably 1:≤0.05, even more preferably 1:≤5 0.01, especially from 1:0.001 to 1:0.0001.

The same also applies to reaction products based on the reaction of silanes of the formula IX with compounds of the Formulae II, IV, IX, VI, VII and/or VIII.

Applied to a glass sheet, metal surface or other substrate surface, the composition comprising condensates or cocondensates crosslinks rapidly with the substrate and forms a hydrophobic layer of high stability. For instance, the silane systems which crosslink at room temperature are not detached again from the glass or metal surface even in boiling water.

This high strength on a substrate layer is also possessed by silane systems based on cocondensates of trisamino-functional alkoxysilanes, such as tris(triethoxysilane)-amine or tris(trimethoxysilane)amine, with alkoxysilanes or organoalkoxysilane systems from the group of n-propyltriethoxysilane, n-propyltrimethoxysilane (PTMO), 3-glycidyloxypropyltriethoxysilane (GLYEO), 3-glycidyloxypropyltrimethoxysilane (GLYMO), 3-aminopropyltriethoxysilane (AMEO), 3-aminopropyltrimethoxysilane (AMMO), methacryloxypropyltriethoxysilane (MEEO), methacryloxypropyltrimethoxysilane (MEMO), N-(n-butyl)-3-aminopropyltriethoxysilane, vinyltriethoxysilane (VTMO), N-(n-butyl)-3-aminopropyltrimethoxysilane (Dynasylan® 1189), 3-mercaptopropyltrimethoxysilane (MTMO), 3-mercaptopropyltriethoxysilane (MTEO), N-2-aminoethyl-3-aminopropyltrimethoxysilanes (DAMO), polyethylene glycol-functionalized alkoxysilanes, tetraethoxysilane (Dynasylan A), tetramethoxysilane (Dynasylan M), methyltriethoxysilane (MTES), methyltrimethoxysilane (MTMS), bis(triethoxysilylpropyl)tetrasulphane (Si 69), bis(triethoxysilylpropyl)-disulphane (Si 266), bis(trimethoxysilylpropyl)disulphane, bis(trimethoxysilylpropyl)tetrasulphane, vinyltriethoxysilane (VTEO), 1-aminomethyltriethoxysilyne, 1-aminomethyltrimethoxysilyne, 1-methacryloxymethyltrimethoxysilane, 1-methacryloxymethyltriethoxysilane, 1-mercaptomethyltriethoxysilane, 1-mercaptomethyltrimethoxysilane, isobutyltrimethoxysilane, isobutyltriethoxysilane, octyltriethoxysilane (Dynasylan® OTEO), octyltrimethoxysilane, hexadecyltriethoxysilane, hexadecyltrimethoxysilane, phenyltrimethoxysilane, phenyltriethoxysilane, 2-aminoethyl-3-aminopropylmethyldimethoxysilanes, 2-aminoethyl-3-aminopropylmethyldiethoxysilanes, ureidopropyltrimethoxysilane, ureidopropyltriethoxysilane, tridecafluorooctyltriethoxysilane, tridecafluorooctyltrimethoxysilane, organoalkoxysilylalkylsuccinic anhydride such as triethoxysilylpropylsuccinic anhydride, trimethoxysilylpropylsuccinic anhydride, methyldiethoxysilylpropylsuccinic anhydride, methyldimethoxysilylpropylsuccinic anhydride, dimethylethoxysilylpropylsuccinic anhydride, dimethylmethoxysilylpropylsuccinic anhydride—to name just a few examples, Dynasylan® 1151 (alcohol-free aminosilane hydrolysis product), Dynasylan® HS 2627 (alcohol-free cocondensate of aminosilane and alkylsilane), Dynasylan® HS 2776 (aqueous, alcohol-free cocondensate of diaminosilane and alkylsilane), Dynasylan® HS 2909 (aqueous, alcohol-free cocondensate of aminosilane and alkylsilane), Dynasylan® HS 2926 (aqueous, alcohol-free product based on epoxysilane), Dynasylan® SIVO 110 (aqueous, alcohol-free product of epoxysilane), bis(triethoxysilane) amine and/or bis(trimethoxysilane)amine.

It is of particular relevance that the hydrophobicity and reactivity of the cured surface can be adjusted in a controlled manner by the specific combination of said silanes. However, a prerequisite is always the presence of at least one trisaminofunctional compound or the hydrolysis and/or condensation products thereof in the essentially solvent-free composition, for example of tris(trialkoxysilane)amine, in order to obtain the low curing temperature. Therefore, even aqueous silane systems based on differently substituted alkoxysilanes cure at low temperatures, provided that a trisamino-functional compound is present as a further component. Even by cocondensation with fluorosilanes it is possible to prepare aqueous silane systems which cure at room temperature, i.e. especially crosslink with the reactive functionalities of the substrate surface and/or enter into interactions or reactions, and form stable oleophobic surfaces.

In a particularly preferred alternative, the invention also provides a composition which comprises essentially water-soluble, tris-silylated amino-functional silicon compounds and water, especially as a sol-gel system or solution, the silicon compounds being derived from alkoxysilanes and having crosslinking structural elements which form catenated, cyclic, crosslinked and/or three-dimensionally crosslinked structures, at least one structure in idealized form corresponding to the general formula I (I)

$(R^1O)[(R^1O)_{1-x}(R^3)_xSi(B)O]_b[Si(C)(R^5)_y(OR^1)_{1-y}O]_c[(Y)_{2-\Delta}(R^{11})_\Delta Si(A)Si(R^{11})_\Delta(Y)_{2-\Delta}O]_a$
$[(Y)_{2-\Omega}(R^{12})_\Omega SiZ]N[ZSi(R^{12})_\Omega(Y)_{2-\Omega}O]_\Sigma[Si(D)(R^7)_u(OR^1)_{1-u}O]_d[Si(E)(R^8)_v(OR^1)_{1-v}O]_w R^1\bullet(HX)_e$
|
$[ZSi(R^{12})_\Omega(Y)_{3-\Omega}]$ where, in the structural elements derived from alkoxysilanes, A is a bivalent aminoalkyl radical, B is an aminoalkyl radical, C is an alkyl radical, D is an epoxy or ether radical and E is an organofunctional radical, Z in tris-silylated amine is independently a bivalent alkylene radical, Y is $OR^1$ or, in crosslinked and/or three-dimensionally crosslinked structures, independently $OR^1$ or $O_{1/2}$, where $R^1$ is independently essentially hydrogen, and $R^3$, $R^5$, $R^7$, $R^8$, $R^{11}$ and/or $R^{12}$ are each independently organofunctional radicals and HX is an acid where X is an inorganic or organic acid radical, where $0 \leq \Delta \leq 2$, $0 \leq \Omega \leq 2$; $0 \leq x \leq 1$, $0 \leq y \leq 1$, $0 \leq u \leq 1$, $0 \leq v \leq 1$, $a \geq 0$, $b \geq 0$, $c \geq 0$, $d \geq 0$, $w \geq 0$, $\Sigma \geq 1$, $e \geq 0$ and $(a+b+c+d+w+\Sigma+e) \geq 2$, the composition being essentially free of organic solvents and releasing essentially no further alcohol in the course of crosslinking, and the silicon compounds are especially present essentially in fully hydrolysed and at least partially condensed form, in cocondensed form, or partially in the form of a block cocondensate. The tris-silylated silicon compounds are therefore preferably essentially free of alkoxy groups.

The reaction products derived from alkoxysilanes, especially of the Formulae II, IX, IV, VI, VII and/or VIII, have, as crosslinked structural elements of the silicon compounds, preferably the A, B, D, E, Z, Y, $R^1$, $R^3$, $R^5$, $R^7$, $R^8$, $R^{11}$ and/or $R^{12}$ radicals.

Particular preference is given to the silicon compounds which are illustrated in idealized form by the general formula I and/or Ia where $c \geq 1$ and $\Sigma \geq 1$ or $d \geq 1$ and $\Sigma \geq 1$ or $w \geq 1$ and $\Sigma \geq 1$, and in each case where $a \geq 0$, $b \geq 0$, $e \geq 0$. Preference is thus given to silicon compounds which are prepared or are obtainable as a reaction product from alkoxysilanes, hydrolysis products and/or condensation products of the Formulae IX and VI or IX and VII or IX and VII, and optionally in each case with the Formulae II and/or III. More particularly, $\Delta=0$, 1 or 2, $\Omega=0$, 1 or 2; $x=0$ or 1, $y=0$ or 1, $u=0$ or 1, $v=0$ or 1, $a=0$, 1, 2 to $\infty$, $b=0$, 1, 2 to $\infty$, $c=0$, 1, 2 to $\infty$, $d=0$, 1, 2 to $\infty$, $w=0$, 1, 2 to $\mu$, $\Sigma=0$, 1, 2 to $\infty$ and $e=0$, 1, 2 to $\infty$, where $(a+b+c+d+w+\Sigma+e) \geq 2$.

In a particularly preferred composition, c is $\geq 1$ for the structural element containing C, an alkyl radical, especially at a pH less than 12, preferably with a pH in the range from 3.5 to 6. Alternatively, d may be $\geq 1$ for the structural element containing D, an epoxy or ether radical. In a further preferred alternative, w may be $\geq 1$ for the structural element containing E, an organofunctional radical, such as a fluorinated alkyl or an alkoxy radical, where the pH in the composition is preferably less than 12, especially in the range from 3.5 to 6.

The inventive compositions have a pH below 12, especially in the range from 1 to 12, preferably in the range from 1 to 9, more preferably in the range from 1 to 5.4, especially preferably in the range from 3.0 to 5.4, but especially in the range from pH 3.5 to 4.8. The pH is a critical parameter and, depending on the exact composition of the silicon compounds, has a great influence on the water solubility and the stability of the composition.

Useful acids for preparation of the composition or else for adjustment of the pH of the end product include customary organic or inorganic acids familiar to those skilled in the art. These are especially water-soluble acids, such as formic acid, acetic acid, citric acid, an acidic silica sol, glacial acetic acid, nitric acid, sulphuric acid and/or phosphoric acid.

In one embodiment, it is possible, by using the inventive aqueous, essentially solvent-free composition containing trisamino-functional silicon compounds together in mixtures with further silane systems, to modify the product properties of the silane systems in a positive manner. For example, the curing temperature of these silane systems can be lowered without any adverse effect on performance.

In addition, unhydrolysed silanes can be added to the inventive compositions. This can be done, for example, immediately before use.

The use spectrum of the inventive aqueous silane systems is very varied; they can be used as a hydrophobizing agent on a wide variety of different substrates, for example glass or concrete, brick, sandstone etc. In combination with fluorosilanes—as a cocondensate or mixture—it is additionally possible to obtain substrates with additionally oleophobic and anti-graffiti and/or anti-fingerprint properties. Further fields of use arise in the priming of substrate surfaces, for example glass, metal, concrete, sandstone, brick and further inorganic substrates etc. The priming of metal surfaces, for example, achieves the adhesion of the top layer, for example but not exclusively for 1K and 2K liquid coating materials or powder coating materials, and hence also improved corrosion protection. In addition, the aqueous silane systems based on trisamino-functional silane compounds can also be used for rock consolidation or in aqueous coating material formulations, coating material dispersions, or in dispersions in general.

It is likewise possible to use inventive silane systems as such or in formulations for applications in which a biocidal, fungicidal or virucidal effect is also desired, for example for the coating or surface treatment of medical equipment or instruments.

The inventive compositions are based on water-soluble, tris-silylated amino-functional silicon compounds derived from at least one or more than one alkoxysilane, such as mono- or difunctionalized alkoxysilanes or tetraalkoxysilanes, the silicon compounds having crosslinking structural elements, especially in the silicon compounds prepared or obtainable via the process according to the invention, where A in the structural element is a bivalent aminoalkyl radical derived from the general formula II

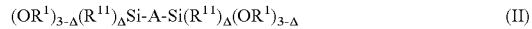

$$(OR^1)_{3-\Delta}(R^{11})_\Delta Si\text{-}A\text{-}Si(R^{11})_\Delta(OR^1)_{3-\Delta} \qquad (II)$$

where A is a bivalent amino-functional group of the formula III

$$-Z^*-[NH(CH_2)_f]_g NH[(CH_2)_{f^*}NH]_{g^*}-Z^*- \qquad (III)$$

in which $Z^*$ is independently a bivalent alkylene radical, especially $-(CH_2)_i-$ or a structural isomer, preferably $-CH_2-$, $-(CH_2)_2-$, $-(CH_2)_3-$, or $-[CH_2CH(CH_3)CH_2]-$, and in which i, f, f*, g or g* are the same or different, where i=0 to 8, f and/or f*=1, 2 or 3, g and/or g*=0, 1 or 2, $R^{11}$ is a linear, branched and/or cyclic alkyl radical having 1 to 24 carbon atoms, especially 1 to 16 carbon atoms, preferably 1 to 8 carbon atoms, more preferably 1 to 4 carbon atoms, or an aryl radical, where $\Delta=0$ or 1, where i is preferably 0, 1, 2, 3 or 4, Z in the tris-silylated amine structural element is independently a bivalent alkylene radical derived from the general formula IX

$$N[ZSi(R^{12})_\Omega(OR^1)_{3-\Omega}]_3 \qquad (IX)$$

where Z is independently a bivalent alkylene radical, especially from the group of $-CH_2-$, $-(CH_2)_2-$, $-(CH_2)_3-$ or $-[CH_2CH(CH_3)CH_2]-$, $R^{12}$ is a linear, branched and/or cyclic alkyl radical having 1 to 24 carbon atoms, especially 1 to 16 carbon atoms, preferably 1 to 8 carbon atoms, more preferably 1 to 4 carbon atoms, or an aryl radical and, independently, $\Omega=0$ or 1, B in the structural element is an amino-functional radical derived from the general formula IV $$B\text{—}Si(R^3)_x(OR^1)_{3-x} \quad (IV)$$

where x=0 or 1, where $R^3$ is a linear, branched or cyclic alkyl radical having 1 to 24 carbon atoms, especially 1 to 16 carbon atoms, preferably 1 to 8 carbon atoms, more preferably 1 to 4 carbon atoms, and/or a substituted or unsubstituted aryl radical, arylalkyl radical, and B is one of the following amino-functional groups of the general formula Va or Vb $$R^{10}{}_{h*}\text{—NH}_{(2-h*)}[(CH_2)_h(NH)]_j[(CH_2)_l(NH)]_n\text{—}(CH_2)_k\text{—} \quad (Va)$$

in which 0≤h≤6; h*=0, 1 or 2, j=0, 1 or 2; 0≤l≤6; n=0, 1 or 2; 0≤k≤6 and $R^{10}$ is a benzyl, aryl, vinyl, formyl radical and/or a linear, branched and/or cyclic alkyl radical having 1 to 8 carbon atoms, preferably k=3, n=1 or 2, l=1, 2 or 3 and j=0, more preferably k=3, n=1 or 2, l=2 and j=0; m=2 and p=3 for an N,N-di(2-aminoethyl)-3-aminopropyl radical, and/or $$[NH_2(CH_2)_m]_2N(CH_2)_p\text{—} \quad (Vb)$$

where 0≤m≤6 and 0≤p≤6,

C in the structural element is an alkyl radical derived from the general formula VI $$C\text{—}Si(R^5)_y(OR^1)_{3-y} \quad (VI)$$

where y=0 or 1, where C is a linear, branched or cyclic alkyl radical having 1 to 20 carbon atoms, $R^5$ is a linear, branched or cyclic alkyl radical having 1 to 24 carbon atoms, especially 1 to 16 carbon atoms, preferably 1 to 8 carbon atoms, more preferably 1 to 4 carbon atoms, and/or a substituted or unsubstituted aryl radical or arylalkyl radical, D in the structural element is an epoxy or ether radical derived from the general formula VII $$D\text{-}Si(R^7)_u(OR^1)_{3-u} \quad (VII),$$

where u=0 or 1, where D is a 3-glycidoxyalkyl, 3-glycidoxypropyl, epoxyalkyl, epoxycycloalkyl, polyalkylglycolalkyl radical or a polyalkylglycol-3-propyl radical, $R^7$ is a linear, branched and/or cyclic alkyl radical, having 1 to 24 carbon atoms, especially 1 to 16 carbon atoms, preferably 1 to 8 carbon atoms, more preferably 1 to 4 carbon atoms, or an aryl radical, and/or E in the structural element is an organofunctional radical derived from the general formula VIII $$E\text{-}Si(R^8)_v(OR^1)_{3-v} \quad (VIII),$$

where v=0 or 1, where $R^8$ is a linear, branched or cyclic alkyl radical having 1 to 24 carbon atoms, especially 1 to 16 carbon atoms, preferably 1 to 8 carbon atoms, more preferably 1 to 4 carbon atoms, E is an $R^{8*}\text{—}Y_m\text{—}(CH_2)_s\text{—}$ radical where $R^{8*}$ is a mono-, oligo- or perfluorinated alkyl radical having 1 to 9 carbon atoms or a mono-, oligo- or perfluorinated aryl radical, where, in addition, Y is a $CH_2$, O, aryl or S radical and m=0 or 1 and s=0 or 2 and/or E is a vinyl, allyl, isopropenyl radical, mercaptoalkyl radical, sulphanealkyl radical, ureidoalkyl radical, an acryloyloxyalkyl radical or a linear, branched or cyclic alkoxy radical having 1 to 24 carbon atoms, especially 1 to 16 carbon atoms, preferably 1 to 4 carbon atoms and $R^1$ in the Formulae II, IX, IV, VI, VII and/or VIII is in each case independently a linear, cyclic and/or branched alkyl radical having 1 to 24 carbon atoms, especially 1 to 16 carbon atoms, preferably 1 to 8 carbon atoms, more preferably 1 to 4 carbon atoms.

$R^1$ is typically a methyl, ethyl or propyl radical.

Compounds of the formula IX useable with preference are: tris(trialkoxysilylalkyl)amine, tris-N,N'-(trialkoxysilylalkyl)alkylenediamine and/or tris-N,N'-(trialkoxysilylalkyl)dialkylenetriamine, especially tris(triethoxysilylpropyl)amine ($N[(CH_2)_3Si(OC_2H_5)_3]_3$, tris-AMEO), tris(trimethoxysilylpropyl)amine ($N[(CH_2)_3Si(OCH_3)_3]_3$, tris-AMMO), tris-DAMO ($N[(CH_2)_2NH(CH_2)_3Si(OCH_3)_3]_3$ and/or tris-TRIAMO ($N[(CH_2)_2NH(CH_2)_2NH(CH_2)_3Si(OCH_3)_3]_3$), particular preference being given to tris-AMEO and tris-AMMO.

Bisaminoalkoxysilane compounds of the formula II useable with preference are: bis(trialkoxysilylalkyl)amine, bis-N,N'-(trialkoxysilylalkyl)alkylenediamine and/or bis-N,N'-(trialkoxysilylalkyl)dialkylenetriamine, especially bis(triethoxysilylpropyl)amine (($H_5C_2O)_3Si(CH_2)_3NH(CH_2)_3Si(OC_2H_5)_3$, bis-AMEO), bis(trimethoxysilylpropyl)amine (($H_3CO)_3Si(CH_2)_3NH(CH_2)_3Si(OCH_3)_3$, bis-AMMO), bis-DAMO (($H_3CO)_3Si(CH_2)_3NH(CH_2)_2NH(CH_2)_3Si(OCH_3)_3$) and/or bis-TRIAMO (($H_3CO)_3Si(CH_2)_3NH(CH_2)_2NH(CH_2)_2NH(CH_2)_3Si(OCH_3)_3$), bis(diethoxymethylsilylpropyl)amine, bis(dimethoxymethylsilylpropyl)amine, bis(triethoxysilylmethyl)amine, bis(trimethoxysilylmethyl)amine, bis(diethoxymethylsilylmethyl)amine, bis(dimethoxymethylsilylmethyl)amine, ($H_3CO)_2(CH_3)Si(CH_2)_3NH(CH_2)_2NH(CH_2)Si(OCH_3)_2(CH_3)$ and/or ($H_3CO)_3(CH_3)Si(CH_2)_3NH(CH_2)_2NH(CH_2)_2NH(CH_2)_3Si(OCH_3)_2(CH_3)$, particular preference being given to bis(triethoxysilylpropyl)amine (($H_5C_2O)_3Si(CH_2)_3NH(CH_2)_3Si(OC_2H_5)_3$, bis-AMEO).

Aminoalkoxy compounds of the formula IV useable with preference are: aminopropyltrimethoxysilane ($H_2N(CH_2)_3Si(OCH_3)_3$, AMMO), aminopropyltriethoxysilane ($H_2N(CH_2)_3 Si(OC_2H_5)_3$, AMEO), diaminoethylene-3-propyltrimethoxysilane ($H_2N(CH_2)_2NH(CH_2)_3Si(OCH_3)_3$, DAMO), triaminodiethylene-3-propyltrimethoxysilane ($H_2N(CH_2)_2NH(CH_2)_2NH(CH_2)_3Si(OCH_3)_3$ (TRIAMO), aminopropylmethyldiethoxysilane, aminopropylmethyldimethoxysilane, 2-aminoethyltrimethoxysilane, 2-aminoethylmethyldimethoxysilane, 2-aminoethylphenyldimethoxysilane, 2-aminoethyltriethoxysilane, 2-aminoethylmethyldiethoxysilane, 2-aminoethyltriethoxysilane, (2-aminoethylamino)ethyltriethoxysilane, 6-amino-n-hexyltriethoxysilane, 6-amino-n-hexyltrimethoxysilane, 6-amino-n-hexylmethyldimethoxysilane, and especially 3-amino-n-propyltrimethoxysilane, 3-amino-n-propylmethyldimethoxysilane, 3-amino-n-propyltriethoxysilane, 3-amino-n-propylmethyldiethoxysilane, 1-aminomethyltriethoxysilane, 1-aminomethylmethyldiethoxysilane, 1-aminomethyltrimethoxysilane, 1-aminomethylmethyldiethoxysilane, N-butyl-3-aminopropyltriethoxysilane, N-butyl-3-aminopropylmethyldiethoxysilane, N-butyl-3-aminopropyltrimethoxysilane, N-butyl-3-aminopropylmethyldimethoxysilane, N-butyl-1-aminomethyltriethoxysilane, N-butyl-1-aminomethylmethyldimethoxysilane, N-butyl-1-aminomethyltrimethoxysilane, N-butyl-1-aminomethylmethyltriethoxysilane, N-cyclohexyl-1-aminomethylmethyltriethoxysilane, N-cyclohexyl-1-aminomethylmethyltrimethoxysilane, N-phenyl-1-aminomethylmethyltriethoxysilane, N-phenyl-1-aminomethylmethyltrimethoxysilane, N-formyl-3-aminopropyltriethoxysilane, N-formyl-3-aminopropyltrimethoxysilane, N-formyl-1-aminomethylmethyldimethoxysilane and/or N-formyl-1-aminomethylmethyldiethoxysilane or mixtures thereof.

Alkylalkoxysilane compounds of the formula VI useable with preference are: compounds of the formula VI where y=0 or 1, where C is a linear or branched alkyl radical having 1 to 24 carbon atoms, especially having 1 to 8 carbon atoms, preferably a methyl, ethyl, more preferably n-propyl, isopropyl or octyl radical, $R^5$ is a linear, branched or cyclic alkyl radical having 1 to 24 carbon atoms, especially having 1 to 8 carbon atoms, preferably a methyl, ethyl, more preferably n-propyl, isopropyl and/or octyl radical, $R^4$ is a linear and/or branched alkyl radical having 1 to 3 carbon atoms, more preferably a methyl, ethyl and/or isopropyl or n-propyl radical. Preferred alkoxysilane compounds mentioned by way of example are: propyltrimethoxysilane (PTMO), dimethyldimethoxysilane (DMDMO), dimethyldiethoxysilane, methyltriethoxysilane (MTES), propylmethyldimethoxysilane, propylmethyldiethoxysilane, n-octylmethyldimethoxysilane, n-hexylmethyldimethoxysilane, n-hexylmethyldiethoxysilane, propylmethyldiethoxysilane, propylmethyldiethoxysilane, propyltriethoxysilane, isobutyltrimethoxysilane, isobutyltriethoxysilane, octyltrimethoxysilane, octyltriethoxysilane, n-hexyltriethoxysilane, cyclohexyltriethoxysilane, n-propyl-tri-n-butoxysilane, n-propyltrimethoxysilane, n-propyltriethoxysilane, isobutyltriethoxysilane, hexadecyltrimethoxysilane, hexadecyltriethoxysilane, octadecyltrimethoxysilane, octadecylmethyldiethoxysilane, octadecylmethyldimethoxysilane, hexadecylmethyldimethoxysilane and/or hexadecylmethyldiethoxysilane and mixtures of these silanes.

Alkoxysilane compounds of the formula VII which have been functionalized with the D radical and are useable with preference are compounds such as 3-glycidoxypropyltrialkoxysilane, as the triethoxy- or trimethoxysilane; epoxycyclohexyltrialkoxysilane, as the triethoxy- or trimethoxysilane.

The D radical as the polyalkylglycol radical is appropriately selected from the group of polyethyleneglycol-3-propyl (PEG-propyl), polypropyleneglycol-3-propyl, polymethyleneglycol-3-propyl, or from copolymers with propylene glycol and ethylene glycol groups, for example with random distribution or block polymers, where the polyalkylene glycol groups preferably have a mean degree of distribution of about 3 to 14 alkyleneglycol groups per molecule.

Organofunctionalized alkoxysilane compounds of the formula VIII useable with preference are, for example, the following compounds: in a preferred embodiment, E is an $F_3C$ $(CF_2)_r(CH_2)_s$ group where r is an integer from 0 to 9, s is 0 or 2, and r is more preferably 5 and s is more preferably 2, $CF_3(CF_2)_5(CH_2)_2$— or a $CF_3(C_6H_4)$— or a $C_6F_5$— group. In a further embodiment, E is a sulphanealkyl radical of the general formula XI —$(CH_2)_q$—X—$(CH_2)_q$—$Si(R^8)_v$ $(OR^1)_{3-v}$ (XI), where q=1, 2 or 3, X=$S_p$, where p averages 2 or 2.18, or averages 4 or 3.8, with a distribution of 2 to 12 sulphur atoms in the chain, and v, $R^8$ and $R^1$ are each as defined above. The resulting silanes in which E corresponds to the general formula XI may, for example, be bis(triethoxysilylpropyl)disulphane (Si 266), bis(trimethoxysilylpropyl)disulphane, bis(triethoxysilylpropyl)tetrasulphane (Si 69), bis(trimethoxysilylpropyl)tetrasulphane, bis(triethoxysilylmethyl)disulphane, bis(trimethoxysilylmethyl)disulphane, bis(triethoxysilylpropyl)disulphane, bis(diethoxymethylsilylpropyl)disulphane, bis(dimethoxymethylsilylpropyl)disulphane, bis(dimethoxymethylsilylmethyl)disulphane, bis(diethoxymethylsilylmethyl)disulphane, bis(diethoxymethylsilylpropyl)tetrasulphane, bis(dimethoxymethylsilylpropyl)tetrasulphane, bis(dimethoxymethylsilylmethyl)-tetrasulphane, bis(diethoxymethylsilylmethyl)tetrasulphane, 3-mercaptopropyltrimethoxysilane, 3-mercaptopropyltriethoxysilane and/or mixtures. In a further appropriate embodiment, E is a methoxy, ethoxy, isopropoxy or n-propoxy radical, where v=0, such that the compound corresponds to the general formula VIII, a tetraalkoxysilane. Customary tetraalkoxysilanes are tetramethoxysilane or tetraethoxysilane.

Further particularly preferred alkoxysilane compounds of the general formula VIII are also tridecafluoro-1,1,2,2-tetrahydrooctyl-1-trimethoxysilane, tridecafluoro-1,1,2,2-tetrahydrooctyl-1-triethoxysilane or corresponding mixtures comprising silanes derived therefrom, or 3,3,3-trifluoropropyltrimethoxysilane, 3,3,3-trifluoropropylmethyldimethoxysilane, 3,3,3-trifluoropropylmethyldimethoxysilane, 3,3,3-trifluoropropylcyclohexyldimethoxysilane, 3,3,3-trifluoropropylphenyldiethoxysilane, 3,3,3-trifluoropropyltriethoxysilane, 3,3,3,2,2-pentafluoropropylmethyldimethoxysilane, 3,3,3-trifluoropropyloxyethyltrimethoxysilane, 3,3,3-trifluoropropylmercaptoethyltrimethoxysilane, 3,3,3-trifluoropropyloxyethylmethyldimethoxysilane, and especially tridecafluoro-1,1,2,2-tetrahydrooctyltrimethoxysilane and tridecafluoro-1,1,2,2-tetrahydrooctyltriethoxysilane, and also acryloyloxypropyltrialkoxysilane, methacryloyloxypropyltrialkoxysilane, where the alkoxy radical can be replaced by methoxy, ethoxy or else propoxy radicals. Suitable compounds are likewise methacryloyloxymethyltriethoxysilane, methacryloyloxymethyltrimethoxysilane, methacryloyloxypropylmethyldiethoxysilane, methacryloyloxypropylmethyldimethoxysilane, methacryloyloxypropylmethyldiethoxysilane, methacryloyloxymethylmethyldiethoxysilane and/or methacryloyloxymethylmethyldimethoxysilane and/or mixtures.

Preferably, the composition is essentially free of free alcohol and the silicon compound is essentially free of alkoxy groups, and so the molar ratio of silicon atoms in the silicon compounds to alcohol and alkoxy groups, or $HOR^1$ and $-OR^1$, in the general formula I or Ia, is preferably greater than 1:0.1, the calculation including only $R^1$ which are not hydrogen, i.e. only $R^1$ which are independently a linear, cyclic and/or branched alkyl radical, especially having 1 to 4 carbon atoms. Even a ratio of 1:1 is appropriate, which means that fewer than 1 mol of alcohol or alkoxy groups is present per 1 mol of silicon atoms, and the ratio is especially greater than 1:0.5, preferably greater than 1:0.05, more preferably greater than 1:0.01, especially preferably greater than 1:0.005.

The contents in percent by weight in the composition (end product) which are specified hereinafter reflect the proportion of the alkoxysilane compound(s) used before the inventive reaction and removal of the alcohol of hydrolysis from the reaction mixture.

Preferably, the content in percent by weight, reported as the proportion of the alkoxysilane compound(s) used, in the composition is 0.1 to 99.9% by weight, especially 1 to 80% by weight, 5 to 60% by weight, preferably 5 to 50% by weight, more preferably 7.5 to 40% by weight in relation to the overall composition, especially at a pH less than 12, especially in the range from 1 to 6, preferably in the range from 1 to 4.8, more preferably in the range from 3.5 to 4.5. Generally, any composition can also be adjusted to a content below 1% by weight, especially to 0.0001 to 1% by weight, by measures familiar to those skilled in the art. These measures include dilution before and/or after the preparation, or else shortly before the application. Useful diluents/dilution media include customary media such as water, solvents or else coating materials or formulations from the pharmaceutical, cosmetic, construction sector or else mechanical engineering sector. The composition can be diluted, for example, shortly before the use thereof as a composition or agent for treatment and/or modification of substrates. For this purpose, the aqueous composition, especially with a content, based on the alkoxysilanes used, of 0.1 to 95.5% by weight of silicon compounds, can be diluted, for example, 1:0.5 to 1:1000 with water or an aqueous phase. Typical dilutions are in the range from 1:1 to 1:100, especially in the range from 1:50, preferably in the range from 1:1 to 1:10. The solvents used may be alcohols, ethers, ketones, esters, mixtures of these solvents, or solvents familiar to the person skilled in the art in general.

Inventive compositions already crosslink from 0° C. and preferably below 100° C., especially in the range from 15 to 25° C. It is clear to the person skilled in the art that the crosslinking or curing may proceed more rapidly at elevated temperatures, for example up to 200° C. Preferred compositions release less than 1% by weight to 0% by weight, preferably less than 0.4% by weight, more preferably below 0.3% by weight to 0% by weight, of alcohol in relation to the overall composition in the course of curing.

A composition is considered to be stable when it does not become cloudy or solidify over a period of at least 2 months, preferably 6 months, at room temperature in a closed container, more preferably over 10 months at room temperature (20 to 25° C.). Particularly stable compositions are stable under the conditions mentioned over the course of 12 months. Alternatively, particularly stable compositions may have a stability of up to 2 months, especially of 6 months, under stress conditions. Stress conditions are understood to mean storage in a closed container at 60° C.

The pH of the composition is generally established as early as in the course of preparation thereof, and so there is no need to later adjust the pH. The acids used to adjust the pH, especially in the form of HX where X is an inorganic or organic acid radical, preferably include formic acid, acetic acid, an acidic silica gel, an acidic silica sol, glacial acetic acid, nitric acid, sulphuric acid and/or phosphoric acid. Useful silica sols include especially Levasil 100S as acidic silica sol, but also precipitated silica, dispersed silica. In addition, the person skilled in the art is aware of further customary suitable acids which can serve for hydrolysis and/or condensation and for adjustment of the pH of the finished composition.

In general, all compositions are particularly stable when the pH is in the range from 1.0 to 6, especially 3.0 to 5.4, preferably from 3.0 to 4.8, more preferably from 3.5 to 4.8.

Appropriately, the pH in the essentially solvent-free compositions which release essentially no further alcohol even in the course of crosslinking can also be adjusted such that the silicon compounds are still water-soluble and/or stable. In general, this may be the case up to a pH of about 6.0 or even slightly higher.

A structural element of a monomeric siloxane or bissiloxane unit is understood in the present context to mean the individual M, D, T or Q unit, i.e. the alkoxy-substituted silane, the hydrolysed silane formed therefrom, and/or the condensation product. According to the invention, the structural elements, especially the following structural elements $N[ZSi(R^{12})_\Omega(Y)_{3-\Omega}]_3$, $N[ZSi(Y)_3]_3$, $[(R^1O)_{1-x}(R^1)_xSi(B)O]_b$, $(R^1O)[(R^1O)_{1-x}(R^3)_xSi(B)O]_b$, $[(R^1O)_{1-x}(R^1)_x(Si(B)O]_b$, $[(R^1O)_1Si(B)O]_b$, $[(Y)_{2-A}(R^{11})_ASi(A)Si(R^{11})_A(Y)_{2-A}O]_a$, $[(Y)_2Si(A)Si(Y)_2O]_a$, $(Y)[(Y)_2Si(A)Si(Y)_2O]_a$, $[Si(C)(OR^1)_1 O]_c$, $[Si(C)(R^5)_y(OR^1)_{1-y}O]_c$, $[Si(C)(R^5)_y(OR^1)_{1-y}O]R^1_c$, $[Si(D)(R^7)_u(OR^1)_{1-u}O]_d$, $[Si(D)(R^7)_u(OR^1)_{1-u}O]R^1_d$, $[Si(E)(R^8)_v(OR^1)_{1-v}O]_w$, $[Si(E)(OR^1)_1O]_w$, $[Si(Y)_2O]_w$ form, from tetraalkoxysilane, and/or $[Si(E)(R^8)_v(OR^1)_{1-v}O]_wR^1$, catenated, cyclic, crosslinked and/or three-dimensionally crosslinked structures with statistical and/or random distribution of the structural elements and/or block condensates of the structural elements; see, for example, Scheme I. The general formula Ia or I do not represent the structure or composition actually present. They correspond to an idealized possible representation. The composition preferably contains silicon compounds which result from statistical and/or random cohydrolysis and/or cocondensation and/or block condensation of the structural elements mentioned, based on the alkoxysilanes substituted by Z, A, B, C, D or E radicals in accordance with the invention, and/or form under the selected experimental conditions.

The substitution pattern also applies correspondingly to catenated, cyclic, crosslinked and/or three-dimensionally crosslinked silane systems/silicon compounds not shown in idealized form, where Y is an $OR^1$ or, in crosslinked and/or three-dimensionally crosslinked structures, independently $OR^1$ or $O_{1/2}$—in a siloxane bond, $R^1$ in the silicon compounds is essentially hydrogen, where the $OR^1$ radicals in crosslinked and/or three-dimensionally crosslinked structures may also each independently form siloxane bonds with $O_{1/2}$ or these radicals may independently be present as $O_{1/2}$, and $R^3$, $R^5$, $R^7$, $R^8$, $R^{11}$ and/or $R^{12}$ are organofunctional radicals, Z in the tris-silylated amine is independently a bivalent alkylene radical, A is a bisaminoalkyl radical, B is an aminoalkyl radical, C is an alkyl radical, D is an epoxy or ether radical and E is an organofunctional radical. Scheme I shows by way of example, in a nonlimiting manner, possible idealized representation variants of the general Formulae Ia and I.

Scheme I:

Illustrative, nonexclusive, possible idealized depiction variants of the general Formulae Ia and I $(R^1O)[(R^1O)_{1-x}(R^3)_x Si(B)O]_b[Si(C)(R^5)_y(OR^1)_{1-y}O]_c[(Y)_{2-\Delta}(R^{11})_\Delta Si(A)Si(R^{11})_\Delta(Y)_{2-\Delta}O]_a[(Y)_{2-\Omega}(R^{12})_\Omega SiZ][ZSi(R^{12})_\Omega(Y)_{2-\Omega}O]_{\Sigma}[Si(D)(R^7)_h(OR^1)_{1-h}O]_d[Si(E)(R^8)_h(OR^1)_{1-h}O]_hR^{1\bullet}(HX)_e$
$\qquad\qquad\qquad\qquad\qquad\qquad\qquad\qquad\qquad\qquad\qquad\qquad\qquad |$
$\qquad\qquad\qquad\qquad\qquad\qquad\qquad\qquad\qquad\qquad\qquad\qquad\quad [ZSi(R^{12})_\Omega(Y)_{3-\Omega}]$ $(R^1O)[(R^1O)_{1-x}(R^3)_x Si(B)O]_b[(Y)_{2-\Delta}(R^{11})_\Delta Si(A)Si(R^{11})_\Delta(Y)_{2-\Delta}O]_a[(Y)_{2-\Omega}(R^{12})_\Omega SiZ][ZSi(R^{12})_\Omega(Y)_{2-\Omega}O]_{\Sigma}[Si(D)(R^7)_h(OR^1)_{1-h}O]_d[Si(E)(R^8)_h(OR^1)_{1-h}O]_hR^{1\bullet}(HX)_e$
$\qquad\qquad\qquad\qquad\qquad\qquad\qquad\qquad\qquad\qquad\qquad\qquad\qquad |$
$\qquad\qquad\qquad\qquad\qquad\qquad\qquad\qquad\qquad\qquad\qquad\qquad\quad [ZSi(R^{12})_\Omega(Y)_{3-\Omega}]$ $(R^1O)[Si(E)(R^8)_h(OR^1)_{1-h}O]_hSi(C)(R^5)_y(OR^1)_{1-y}O]_c[(Y)_{2-\Delta}(R^{11})_\Delta Si(A)Si(R^{11})_\Delta(Y)_{2-\Delta}O]_a[(Y)_{2-\Omega}(R^{12})_\Omega SiZ][ZSi(R^{12})_\Omega(Y)_{2-\Omega}O]_{\Sigma}[Si(D)(R^7)_h(OR^1)_{1-h}O]_d[Si(E)(R^8)_h(OR^1)_{1-h}O]_hR^{1\bullet}(HX)_e$
$\qquad\qquad\qquad\qquad\qquad\qquad\qquad\qquad\qquad\qquad\qquad\qquad\qquad |$
$\qquad\qquad\qquad\qquad\qquad\qquad\qquad\qquad\qquad\qquad\qquad\qquad\quad [ZSi(R^{12})_\Omega(Y)_{3-\Omega}]$ $(R^1O)[(R^1O)_{1-x}(R^3)_x Si(B)O]_b[Si(C)(R^5)_y(OR^1)_{1-y}O]_c[(Y)_{2-\Delta}(R^{11})_\Delta Si(A)Si(R^{11})_\Delta(Y)_{2-\Delta}O]_a[(Y)_{2-\Omega}(R^{12})_\Omega SiZ][ZSi(R^{12})_\Omega(Y)_{2-\Omega}O]_{\Sigma}R^{1\bullet}(HX)_e$
$\qquad\qquad\qquad\qquad\qquad\qquad\qquad\qquad\qquad\qquad\qquad\qquad\qquad |$
$\qquad\qquad\qquad\qquad\qquad\qquad\qquad\qquad\qquad\qquad\qquad\qquad\quad [ZSi(R^{12})_\Omega(Y)_{3-\Omega}]$ $(R^1O)[Si(C)(R^5)_y(OR^1)_{1-y}O]_c[(Y)_{2-\Omega}(R^{12})_\Omega SiZ][ZSi(R^{12})_\Omega(Y)_{2-\Omega}O]_{\Sigma}R^{1\bullet}(HX)_e$
$\qquad\qquad\qquad\qquad\qquad\qquad\qquad\qquad |$
$\qquad\qquad\qquad\qquad\qquad\qquad\qquad [ZSi(R^{12})_\Omega(Y)_{3-\Omega}]$ $(R^1O)[(R^1O)_{1-x}(R^3)_x Si(B)O]_b[(Y)_{2-\Delta}(R^{11})_\Delta Si(A)Si(R^{11})_\Delta(Y)_{2-\Delta}O]_a[(Y)_{2-\Omega}(R^{12})_\Omega SiZ][ZSi(R^{12})_\Omega(Y)_{2-\Omega}O]_{\Sigma}[Si(E)(R^8)_h(OR^1)_{1-h}O]_hR^{1\bullet}(HX)_e$
$\qquad\qquad\qquad\qquad\qquad\qquad\qquad\qquad\qquad\qquad\qquad\qquad\qquad |$
$\qquad\qquad\qquad\qquad\qquad\qquad\qquad\qquad\qquad\qquad\qquad\qquad\quad [ZSi(R^{12})_\Omega(Y)_{3-\Omega}]$ A composition essentially free of organic solvents shall be understood to mean compositions which, apart from very low contents, no longer contain any organic solvents, and especially no alcohols, such as methanol, ethanol or propanol. By definition, the alcohol of hydrolysis formed in the hydrolysis of the alkoxysilanes has also been virtually completely removed from these compositions. A composition is considered to be essentially free of organic solvents, especially free of alcohols and/or alkoxy groups, which means that essentially no further alcohol is released in the course of crosslinking either, when the content is less than 5% by weight to 0% by weight, especially less than 4% by weight, preferably below 2% by weight, especially below 1% by weight, more preferably below 0.4% by weight or below 0.3% by weight. The content of the silicon compound is especially 1 to 50% by weight, especially 5 to 60% by weight, preferably 5 to 50% by weight, more preferably 5 to 40% by weight, especially preferably 7.5 to 40% by weight. The content is based on the content of the silanes used in the finished composition.

Inventive compositions containing trisamino-functional silicon compounds contain at least one trisamino-functional structural element based on a trisamino-functional silane of the formula IX and crosslink at temperatures from 0° C., especially from 5° C., preferably in the range from 5 to 30° C., more preferably in the range from 15 to 25° C. Compositions with outstanding properties crosslink in the range from 5 to 30° C. within 24 hours, especially within 12 hours, preferably within 6 hours.

Trisamino-functional compositions according to the invention contain at least one trisamino-functional structural elements based on a tris(trialkoxysilane)amine, where the numerators of the structural elements are $\Sigma \geq 1$, $b \geq 0$, $a \geq 0$, $c \geq 0$, $d \geq 0$, $w \geq 0$ and $e \geq 1$, especially in at least one of the Formulae I and/or Ia.

However, preference is generally given to combinations of at least one tris(trialkoxysilylalkyl)amine, tris-N,N'-(trialkoxysilylalkyl)alkylenediamine and/or tris-N,N'-(trialkoxysilylalkyl)dialkylenetriamine, especially of tris(triethoxysilylpropyl)amine ($N[(CH_2)_3Si(OC_2H_5)_3]_3$, tris-AMEO), tris (trimethoxysilylpropyl)amine ($N[(CH_2)_3Si(OCH_3)_3]_3$, tris-AMMO), tris-DAMO ($N[(CH_2)_2NH(CH_2)_3Si(OCH_3)_3]_3$ and/or tris-TRIAMO ($N[(CH_2)_2NH(CH_2)_2NH(CH_2)_3Si(OCH_3)_3]_3$, particular preference being given to tris-AMEO and tris-AMMO, especially to be reacted with an alkylalkoxysilane, especially with a silane of the Formula VI where $c \geq 1$, such as n-propyltriethoxysilane (PTEO), n-propyltrimethoxysilane (PTMO), dimethyldimethoxysilane (DMDMO), dimethyldiethoxysilane, n-octyltrialkoxysilane, isobutyltrimethoxysilane, isobutyltriethoxysilane, octyltriethoxysilane (Dynasylan® OCTEO), octyltrimethoxysilane, hexadecyltriethoxysilane, hexadecyltrimethoxysilane, phenyltrimethoxysilane, phenyltriethoxysilane and/or methyltriethoxysilane, where the silanes may be either methoxy- or ethoxy-substituted. Appropriate weight ratios in which the reactants are used relative to one another and are then also present correspondingly in the composition are trisamino-functional silane to alkyl-functional silane of 3:1 to 1:2.

Essentially solvent-free compositions which are likewise in accordance with the invention comprise essentially fully hydrolysed and essentially water-soluble, trisamino-functional silicon compounds, where at least one structure corresponds to the general formula I and/or Ia shown in idealized form where $\Sigma \geq 1$, $b \geq 0$, $a \geq 0$, $c \geq 1$, $d \geq 0$ and/or $w \geq 0$ and $e \geq 1$, and where the pH is <12, especially b=0.

Essentially solvent-free compositions which are likewise in accordance with the invention comprise essentially fully hydrolysed and essentially water-soluble, trisamino-functional silicon compounds, where at least one structure corresponds to the general formula (I) shown in idealized form where $\Sigma \geq 1$, $b \geq 0$, $a \geq 1$, $c \geq 0$, $d \geq 0$ and/or $w \geq 0$ and $e \geq 1$, and where the pH is <12, especially c=0, where the pH is preferably in the range from 3.5 to 6.

Essentially solvent-free compositions which are likewise in accordance with the invention comprise essentially fully hydrolysed and essentially water-soluble, trisamino-functional silicon compounds, where at least one structure corresponds to the general formula (I) shown in idealized form where $\Sigma \geq 1$, $b \geq 0$, $a \geq 0$, $c \geq 0$, $d \geq 0$ and/or $w \geq 0$ and $e \geq 1$, and where the pH is <12, especially a=0, b=0 and c=0 and $d \geq 1$ and/or $w \geq 1$, where the pH is preferably in the range from 3.5 to 4.8.

Alternative essentially solvent-free compositions comprise essentially water-soluble, trisamino-functional silicon compounds, especially with the particular proviso that especially at least one structure corresponds to the general formula Ia or I shown in idealized form where $\Sigma \geq 1$ and $b \geq 0$ and/or $a \geq 0$ and ($c \geq 1$ or $d \geq 1$ or $w \geq 1$) and $e \geq 1$, where the pH is preferably in the range from 1.0 to 6, especially in the range from 3.0 to 6, especially in the range from 3.5 to 6, more preferably in the range from 3.5 to 5, preferably in the range from 3.5 to 5.

The compositions may preferably consist only of water, acid and the silicon compounds derived from the essentially water-soluble alkoxysilanes of the general formula IX, II, IV, VI, VII and/or VIII, and/or the essentially fully hydrolysed, water-soluble hydrolysates and/or condensation or cocondensation products thereof, where especially at least one structure corresponds to the general formula Ia or I shown in idealized form, and are essentially free of organic solvents. The pH of these compositions is preferably in the range from 1 to 6, especially in the range from 2.0 to 5.4, preferably in the range from 3.5 to 4.4. Further additions for stabilization of the composition are generally unnecessary.

It is possible to add nanoscale fillers or generally customary fillers to the composition as assistants and as a further component. These may also be neutral or basic silica sols or silica gels. Additives, such as flow assistants or, for example, catalysts for modification of the curing rate can also be added to the composition.

The invention also relates to a process for preparing a composition comprising essentially water-soluble, tris-silylated amino-functional and especially essentially alkoxy group-free silicon compounds, water and optionally an acid, and especially compositions obtainable by such a process, by hydrolysing at least one tris-silylated aminoalkoxysilane of the formula IX

$$N[ZSi(R^{12})_\Omega(OR^1)_{3-\Omega}]_3 \quad (IX)$$

where Z is independently a bivalent alkylene radical, especially from the group of $-CH_2-$, $-(CH_2)_2-$, $-(CH_2)_3-$, or $-[CH_2CH(CH_3)CH]-$, $R^{12}$ is a linear, branched or cyclic alkyl radical having 1 to 24 carbon atoms, especially having 1 to 16 carbon atoms, preferably having 1 to 8 carbon atoms, more preferably having 1 to 4 carbon atoms, or an aryl radical, and in which $\Omega$ is independently 0 or 1, and/or the hydrolysis and/or condensation products thereof, and optionally at least one bisaminoalkoxysilane of the formula II

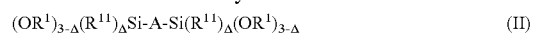

$$(OR^1)_{3-\Delta}(R^{11})_\Delta Si\text{-}A\text{-}Si(R^{11})_\Delta(OR^1)_{3-\Delta} \quad (II)$$

where A is a bisamino-functional group of the formula III

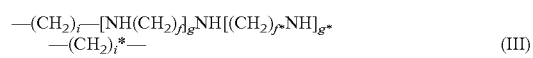

$$-(CH_2)_{f^*}-[NH(CH_2)_f]_{g^*}NH[(CH_2)_{f^*}NH]_{g^*}-(CH_2)_{i^*}- \quad (III)$$

in which i*, i*, f, f*, g and g* are the same or different, where i and/or i*=0 to 8, f and/or f*=1, 2 or 3, g and/or g*=0, 1 or 2, $R^{11}$ is a linear, branched or cyclic alkyl radical having 1 to 24 carbon atoms, especially having 1 to 16 carbon atoms, preferably having 1 to 8 carbon atoms, more preferably having 1 to 4 carbon atoms, or an aryl radical, where Δ=0 or 1, and/or the hydrolysis and/or condensation products thereof, and optionally at least one aminoalkylalkoxysilane of the formula IV

$$B\text{—}Si(R^3)_x(OR^1)_{3-x} \qquad (IV)$$

where x=0 or 1, where $R^3$ is a linear, branched or cyclic alkyl radical having 1 to 24 carbon atoms, especially 1 to 16 carbon atoms, preferably 1 to 8 carbon atoms, more preferably 1 to 4 carbon atoms, where $R^1$ is a linear, branched and/or cyclic alkyl radical having 1 to 24 carbon atoms, especially 1 to 4 carbon atoms, and B is one of the following amino-functional groups of the general formula Va or Vb

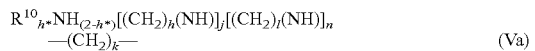

$$R^{10}{}_{h*}\text{—NH}_{(2-h*)}[(CH_2)_h(NH)]_j[(CH_2)_l(NH)]_n\text{—}(CH_2)_k\text{—} \qquad (Va)$$

in which 0≤h≤6; h*=0, 1 or 2, j=0, 1 or 2; 0≤l≤6; n=0, 1 or 2; 0≤k≤6 and $R^{10}$ is a benzyl, aryl, vinyl, formyl radical and/or a linear, branched and/or cyclic alkyl radical having 1 to 8 carbon atoms, and/or $$[NH_2(CH_2)_m]_2N(CH_2)_p\text{—} \qquad (Vb)$$

where 0≤m≤6 and 0≤p≤6 and/or the hydrolysis and/or condensation products thereof, and optionally at least one alkylalkoxysilane of the general formula VI

$$C\text{—}Si(R^5)_y(OR^1)_{3-y} \qquad (VI)$$

where y=0 or 1, where C is a linear, branched or cyclic alkyl radical having 1 to 20 carbon atoms, $R^5$ is a linear, branched or cyclic alkyl radical having 1 to 24 carbon atoms, especially having 1 to 12 carbon atoms, and/or an aryl radical, $R^1$ is a linear, branched and/or cyclic alkyl radical having 1 to 24 carbon atoms, especially having 1 to 4 carbon atoms, and/or the hydrolysis and/or condensation products thereof, and optionally at least one epoxy or ether alkoxysilane of the general formula VII

$$D\text{-}Si(R^7)_u(OR^1)_{3-u} \qquad (VII)$$

where u=0 or 1, where D is a 3-glycidoxyalkyl, 3-glycidoxypropyl, epoxyalkyl, epoxycycloalkyl, polyalkylglycolalkyl or a polyalkylglycol-3-propyl radical, $R^7$ is a linear, branched or cyclic alkyl radical having 1 to 24 carbon atoms, especially having 1 to 4 carbon atoms, and $R^1$ is a linear, branched and/or cyclic alkyl radical having 1 to 24 carbon atoms, especially having 1 to 4 carbon atoms or an aryl radical, and/or the hydrolysis and/or condensation products thereof, and optionally at least one organofunctional alkoxysilane of the formula VIII

$$E\text{-}Si(R^8)_v(OR^1)_{3-v} \qquad (VIII)$$

where v=0 or 1, where $R^8$ is a linear, branched or cyclic alkyl radical having 1 to 24 carbon atoms, preferably 1 to 4 carbon atoms, E is an $R^{8*}\text{—}Y_m\text{—}(CH_2)_s\text{—}$ radical where $R^{8*}$ is a mono-, oligo- or perfluorinated alkyl radical having 1 to 9 carbon atoms or a mono-, oligo- or perfluorinated aryl radical, where Y is additionally a $CH_2\text{—}$, $O\text{—}$, aryl or S radical and m=0 or 1 and s=0 or 2, or a vinyl, allyl, isopropenyl radical, mercaptoalkyl radical, sulphanealkyl radical, ureidoalkyl radical, an acryloyloxyalkyl radical or a linear, branched or cyclic alkoxy radical having 1 to 24 carbon atoms, especially having 1 to 4 carbon atoms, and $R^1$ is a linear, branched and/or cyclic alkyl radical having 1 to 4 carbon atoms, and/or the hydrolysis and/or condensation products thereof, and/or optionally at least one mixture of two of the abovementioned alkoxysilanes or hydrolysis and/or condensation products thereof, and where $R^1$, in each case independently, in the Formulae IX, II, IV, VI, VII and/or VIII, is a linear, cyclic and/or branched alkyl radical having 1 to 24 carbon atoms, especially having 1 to 12 carbon atoms, preferably having 1 to 8 carbon atoms, more preferably having 1 to 4 carbon atoms, such as methyl, ethyl, propyl and/or butyl;

in the presence of water and optionally in the presence of an acid, and optionally with initial charging and/or addition of alcohol and/or of a catalyst, especially by stirring at a temperature below 100° C., especially in the range from 50 to 70° C., preferably in the range from 55 to 70° C.

To prepare the inventive compositions, including the addition of the silanes of the Formulae IX, II, IV, VI, VII, and/or VIII, stirring is effected over a defined period at the temperatures mentioned, preferably in the range from 40 to 240 minutes, especially in the range from 70 to 180 minutes, preferably around 90 to 150 minutes, at approximately 60 to 65° C., and the alcohol is removed essentially completely, especially in the next step.

The alkoxysilanes to be used with preference and the substitution patterns thereof, especially of the Formulae IX, II, IV, VI, VII and VIII, have been described in detail above and can be used in the process according to the substitution patterns disclosed there. After the removal of the alcohol, the composition can be filtered in order to remove especially particles or impurities having a particle size of more than approximately 20 μm.

The process according to the invention can be performed in such a way that the silanes of the general Formulae IX, II, IV, VI, VII and/or VIII, or the hydrolysis and/or partial condensation and/or condensation products and/or mixtures thereof are added in aqueous and/or alcoholic solution. In addition, the silanes of the general Formulae IX, II, IV, VI, VII or VIII and/or condensation products thereof can be added successively or as a mixture.

According to the desired product, the process according to the invention can be performed in alternative process variants. In a particularly preferred process regime, water and acid are initially charged, for example to an extent of about 92% by weight of the overall mixture after addition of the alkoxysilane (ad 100% by weight); the alkoxysilane of the general formula IX and optionally additionally of the Formulae II, IV, VI, VII and/or VIII is added to an extent of about 8% by weight. The resulting pH should be in the range from 3.5 to 6. Including the metering time of the alkoxysilanes, stirring is typically effected over a period of 90 minutes at elevated temperature, especially at 55 to 70° C., preferably in the range from 60 to 65° C. It is optionally possible to stir at a temperature around 65° C. for a further hour. Subsequently, typically about 10% by weight of the reaction mixture is distilled off as a water/alcohol mixture. In general, an amount corresponding to the amount of acid and added alkoxysilanes is distilled off, such that the remaining total amount can correspond approximately to the original amount of initially charged water. If the remaining alcohol content is too high, it is again possible to add a particular amount of water, in which case this amount can then be distilled off again as a water/alcohol mixture.

In an alternative process regime, water and acid can be initially charged and one silane, at least two silanes at different times, a mixture of silanes, hydrolysed and/or condensed silanes, for example as an oligomer, cocondensates of the silanes and/or block cocondensates, can be added.

For instance, a tris-silylated aminoalkylalkoxysilane of the formula IX and an alkylalkoxysilane of the general formula VI can be reacted with one another in the process according to the invention, or a tris-silylated aminoalkylalkoxysilane of the formula IX and an alkylalkoxysilane of the general formula VII or a tris-silylated aminoalkylalkoxysilane of the formula IX and an alkylalkoxysilane of the general formula VIII, or else additionally optionally an alkoxysilane of the formula II and/or IV. It will be clear to the person skilled in the art that this list names only a few illustrative combinations and should not be understood to be conclusive.

In accordance with an alternative inventive process regime, water and acid are initially charged in a defined amount, then an alkoxysilane of the formula IX, II or IV or a mixture of at least two of the silanes is metered in and stirred at a temperature around 60° C. over a defined period, especially over about one hour including the metering time. The pH after the addition of the silanes should be below pH 6, especially about 3.5 to 6, especially around 4.3. Subsequently, an alkoxysilane of the formula VI can be metered in. Alternatively, a silane of the formula VI or VII or VIII or mixtures or cocondensates of at least two of the silanes mentioned can also be added. The reaction mixture obtained can be stirred at 60 to 70° C. over about 90 minutes, then a water/alcohol mixture is typically distilled off, especially until the weight of the reaction mixture corresponds approximately to the amount of water originally initially charged.

The invention also provides the following process for preparing the composition, and also a composition obtainable by this process, especially comprising the following individual steps:
1) initially charging water and optionally an acid or a catalyst, especially initially charging 60 to 95% by weight of water, preferably around 80 to 95% by weight; preferably in such an amount that the pH is in the range from 1 to 6, especially by adding about 1 to 5% by weight, preferably about 2% by weight, of an acid,
2) heating the mixture of water and optionally an acid or a catalyst to a temperature in the range from 40 to 100° C., preferably in the range from 50 to 90° C., more preferably to around 55 to 70° C., especially to about 60 to 65° C.,
3) adding one or more silanes of the Formulae IX, II, IV, VI, VII and/or VIII or the hydrolysis and/or condensation products mentioned and/or mixtures thereof; especially to an extent of 2 to 40% by weight, preferably in the range from 5 to 15% by weight, especially ad 100% by weight, of the reaction mixture; the pH should especially be kept in the range from 1.5 to 6;
4) stirring over a period of 40 to 400 minutes, including the addition of the silanes, especially over 50 to 240 minutes, preferably over 60 to 200 minutes, more preferably around 60 to 180 minutes, especially at the temperature mentioned,
5) optionally further adding one or more silanes of the Formulae IX; II, IV, VI, VII and/or VIII; especially 1 to 5% by weight ad 100% by weight of the reaction mixture if ad 100% by weight has not already been established in step 3);
6) optionally further stirring over a period of 10 to 400 minutes, including the addition of the silanes, especially over 10 to 240 minutes, preferably over 20 to 180 minutes, more preferably around 20 to 160 minutes, especially at the temperature mentioned,
7) removing an alcohol/water mixture, especially by distillation, for example at elevated temperature and reduced pressure, preferably until the reaction mixture or composition is essentially solvent-free, for example until the remaining amount of reaction mixture corresponds to the amount of water initially charged in stage 1).

The water in 1) is initially charged, in relation to the overall reaction mixture, more preferably to an extent of around 90% by weight; typically, an acid is added in such an amount that, after addition of the silane(s) of the Formulae IX, II, IV, VII and/or VIII, the pH is in the range from 1 to 6, preferably in the range from 1.5 to 6.0. Typically, this is 0.5 to 1.5% by weight of the reaction mixture. Ad 100% by weight of the reaction mixture, at least one or more than one silane of the Formulae IX, II, IV, VII and/or VIII is metered in. This is 9.5 to 8.5% by weight of the reaction mixture. It is clear to the person skilled in the art that the compositions may also contain much higher or lower contents of silicon compounds and the amount of acid should be adjusted correspondingly.

In a departure from prior art processes, the substituted alkoxysilanes are hydrolysed in the aforementioned processes at a water content of 50 to 95% by weight, especially at 65 to 95% by weight, of water. The water content is based on the amount of water initially charged or the total water content in the overall reaction mixture before alcohol and/or water have been removed from the mixture. Additional water can be introduced into the reaction mixture from acids or catalysts in an aqueous form or else from aqueous silanes or the hydrolysis and/or condensation products thereof.

In an inventive alternative, at least one trisamino-functional alkylalkoxysilane of the formula IX and at least one alkylalkoxysilane of the general formula VI are used in the process. Particularly preferred compounds are tris-AMEO, tris-AMMO and propyltrialkoxysilane, such as n-propyltrimethoxysilane, n-propyltriethoxysilane, methyltrimethoxysilane, methyltriethoxysilane, octyltrimethoxysilane, octyltriethoxysilane, vinyltrimethoxysilane, vinyltriethoxysilane, N-n-butyl-3-aminopropyltrimethoxysilane, N-n-butyl-3-aminopropyltriethoxysilane, 3-aminopropyltrimethoxysilane, 3-aminopropyltriethoxysilane, 3-methacryloyloxypropyltrimethoxysilane, 3-glycidyloxypropyltrimethoxysilane—to name just a few examples.

The pH of the composition is generally adjusted as early as in the course of preparation thereof, such that there is no need to adjust the pH at a later stage. Useful acids for adjustment of the pH, especially in the form of HX where X is an inorganic or organic acid radical, preferably include formic acid, acetic acid, citric acid, an acidic silica gel or an acidic silica sol, glacial acetic acid, nitric acid, sulphuric acid and/or phosphoric acid. Useful silica sols include especially Levasil 100S as an acidic silica sol, but also precipitated silica, dispersed silica. The catalyst used may, for example, be zirconium n-propoxide or another customary catalyst.

In general, water and an acid are initially charged, and the silanes of the general Formulae IX, II, IV, VI, VII and/or VIII and/or products derived therefrom, such as protonated silanes, hydrolysis, cocondensation and/or condensation products, are added successively and/or as a mixture, hydrolysed and optionally condensed, especially at a pH in the range from 1.5 to 6, preferably at a pH in the range from 3.0 to 5.4. By further addition of the acid, the pH can be maintained or adjusted during the process. The silanes of the general Formulae IX, II, IV, VI, VII and/or VIII, the hydrolysis, cocondensation or condensation products thereof and/or mixtures thereof can be added in aqueous and/or alcoholic solution. They can be added successively or else in a mixture.

In the case of a process regime in an aqueous/alcoholic solution, by addition of alcohol or of an alcoholic silane solution, the hydrolysis can be performed at a pH below 12, i.e. including under alkaline conditions. Subsequently, the alcohol of hydrolysis and any alcohol additionally added can be removed substantially completely from the reaction mixture. The pH adjustment may precede or follow the removal of the alcohol.

An alcoholic solution can be added to the initially charged acidified water especially in the manner which follows. First, an alcohol, for example ethanol, is admixed with a silane of the Formulae IX, II, IV, VI, VII and/or VIII, optionally with a little water and optionally a catalyst or optionally an acid, and, after a brief reaction, added to the acidified initial charge of water. If the pH is not within the desired range, it can be modified by adding further acid. It is likewise also possible to add further water after addition of at least one silane to the reaction mixture.

According to the desired properties of the composition, it may be appropriate to add inorganic fillers, such as $TiO_2$, $SiO_2$, silica sols, Aerosil dispersions and/or $Al_2O_3$, as early as during the process.

For complete removal of the alcohol of hydrolysis or of the added alcohol, it is possible to continually add water to the composition during the process, which is distilled off azeotropically with the alcohol until the composition is essentially alcohol-free.

Alternatively, an aqueous silane of the general formula IX and/or the cocondensation product or condensation product thereof, for example a cocondensation product of the formula IX, can be initially charged with VI, hydrolysed at a low pH, for example at 1.0 to 4.8, and the silanes of the general Formulae II, IV, VII and/or VIII and/or condensation products thereof are added individually or as a mixture, preference being given to adding at least one silane of the formula VI. By adding further aminosilane of the Formulae IX, II and/or IV, the pH can be raised. After adding the last silane, the reaction mixture can still be hydrolysed essentially completely while stirring at a temperature in the range from 30 to 100° C. Preference is given to performing the hydrolysis in the present process at 40 to 100° C., more preferably at 50 to 90° C., even more preferably at 55 to 70° C., especially at about 60 to 65° C.

The invention therefore also provides a process for preparing a composition comprising essentially water-soluble, trisamino-functional and essentially alkoxy group-free silicon compounds, water and an acid, and also a composition obtainable by this process, wherein
1) an aqueous solution of at least one water-soluble silane of the general Formulae IX, IV and/or VII or the water-soluble condensation products thereof, especially also cocondensation products formed from silanes of the Formulae IX, IV and/or VII with one another or with VI and/or VIII, for example also with silica sols, or the water-soluble hydrolysis products of a silane of the general formula VI, especially the methyl-functionalized hydrolysis product, is initially charged, especially at least partly protonated, and
2) optionally acid, optionally alcohol and optionally a catalyst and optionally one or more further silanes of the general Formulae II, IV, VI, VII and/or VIII or the hydrolysis and/or condensation products thereof and/or mixtures thereof are added, and
3) are hydrolysed and the alcohol is essentially removed.

According to the desired properties of the composition, it may be appropriate to add inorganic fillers such as $TiO_2$, $SiO_2$, silica sols, Aerosil dispersions and/or $Al_2O_3$ as early as during the process.

The alcohol already present and/or formed in the reaction is, in all process variants of the invention, essentially removed from the reaction mixture, preferably completely. The distillative removal of the alcohol is preferably performed under reduced pressure. The distillative removal of the alcohol is preferably performed until a temperature corresponding to the boiling temperature of water has been attained in the top of the column. If it has not been possible to essentially completely remove the alcohol, water is added again and an alcohol/water mixture continues to be removed, especially by distillation. This procedure is repeated until the alcohol has essentially been removed. The alcohol is considered to be essentially removed when the content thereof is below 4% by weight, especially below 2% by weight, preferably below 1, more preferably below 0.5% by weight, below 0.1% by weight or below 0.05% by weight. The resulting composition is essentially alcohol-free, which means that any alcohol added, and also the alcohol of hydrolysis, are preferably removed completely from the reaction system after the hydrolysis, which may or may not be complete. The compositions employed are therefore essentially free of free alcohols and/or alkoxy radicals when the content is less than 4% by weight, especially below 2% by weight, preferably below 1, more preferably below 0.5% by weight, below 0.1% by weight or below 0.05% by weight.

During the reaction, the pH should be below pH 12, especially in the range from 1 to 6, for example in the range from 1.5 to 6, especially 3.0 to 5.4, preferably 3.5 to 4.8. Even after the removal of the alcohol from the reaction mixture, the pH of the composition may be in the range from 1.0 to 6, especially in the range from 1.5 to 6, preferably in the range from 3.0 to 5.4. The alkoxysilanes and/or tetraalkoxysilanes used, substituted by trisamino, bisamino, amino, alkyl, epoxy, polyalkylglycolalkyl, 3-glycidoxyalkyl, glycidoxyalkyl, fluoroalkyl, mercapto, ureidoalkyl, alkenyl, succinic acid, succinic anhydride and acryloyloxyalkyl radicals, are preferably present in the composition with a total content of 5 to 50% by weight, especially at 5 to 50% by weight, preferably at 7.5 to 40% by weight, more preferably at 10 to 30% by weight, after removal of the alcohol in relation to the alkoxysilanes used.

Compositions prepared by the process according to the invention are stable and clear or to some extent also opalescent to cloudy solutions, essentially free of organic solvents, can be diluted with water in any ratio, evolve essentially no alcohols of hydrolysis on addition of water, and have a flashpoint of more than 63° C., preferably of more than 80° C., more preferably of more than 93° C.

The invention further provides an aqueous composition or an aqueous silane system containing essentially water-soluble, trisamino-functional and essentially alkoxy group-free silicon compounds, water and an acid, obtainable by
1) initially charging water, an acid and optionally alcohol and
2) reacting at least one trisamino-functional alkoxysilane of the formula IX, optionally with at least one silane of the general Formulae II, IV, VI, VII and/or VIII or at least two of the aforementioned silanes, where the substitution pattern of the silanes is described above, and/or the hydrolysis and/or the condensation products and/or mixtures thereof, optionally in an aqueous or aqueous/alcoholic or alcoholic phase,
3) hydrolysing, especially fully hydrolysing, essentially completely removing the alcohol, especially by adding further water and removing it as a water/alcohol mixture. This step can be repeated until the aqueous composition is essentially alcohol-free.

The invention further provides a process for preparing a composition comprising essentially water-soluble, trisamino-functional and essentially alkoxy group-free silicon compounds, water and an acid, and a composition obtainable by this process, wherein
1) an organic solvent, optionally water, optionally an acid and/or optionally a catalyst are initially charged and
2)
   at least one trisaminoalkoxysilane of the formula IX and optionally
   at least one bisaminoalkoxysilane of the formula II and/or the hydrolysis and/or condensation products thereof and optionally
   at least one aminoalkylalkoxysilane of the formula IV and/or the hydrolysis and/or condensation products thereof and optionally
   at least one alkylalkoxysilane of the general formula VI and/or the hydrolysis and/or condensation products thereof, and optionally
   at least one epoxy alkoxysilane or ether alkoxysilane of the general formula VII and/or the hydrolysis and/or condensation products thereof, and optionally
   at least one organofunctional alkoxysilane of the formula VIII and/or the hydrolysis and/or condensation products thereof,
   especially at least two of the above-described alkoxysilanes, hydrolysis and/or condensation products and/or mixtures thereof,
   are hydrolysed, especially fully hydrolysed, and the alcohol of hydrolysis and the solvent are essentially removed.

The silanes of the Formulae IX, II, IV, VI, VII and/or VIII correspond to the above definitions. For example, IX can be used in the process with IV, IX with II and VI, IX with VI, IX with VII, IX with VIII or VII, II, IV and VI, or further conceivable combinations.

Useful solvents include especially an alcohol selected from the group of methanol, ethanol, propanol and/or a mixture thereof. Appropriate solvents may, however, also be ethyl acetate, THF, ketones or hydrocarbons.

According to the invention, an alcohol is initially charged together with at least one of the silanes of the general Formulae IX, II, IV, VI, VII and/or VIII, or the hydrolysis and/or condensation products and/or mixtures thereof. Subsequently, water and/or acid can be added. If only water is added, the hydrolysis can be effected under alkaline conditions.

The process is preferably performed in such a way that an alcohol and optionally water are initially charged, at least one trisaminoalkoxysilane of the general formula IX and/or a condensation product thereof is added and hydrolysed, and optionally condensed. The reaction mixture becomes alkaline as a result of the addition of the trisaminoalkoxysilane of the general formula IX. According to the invention, at least one trisaminoalkylalkoxysilane of the formula IX and an alkylalkoxysilane of the general formula VI are used.

When alcohol and optionally water and optionally an acid are initially charged, a trisaminoalkoxysilane of the general formula IX and/or the condensation product thereof are added and hydrolysed, and optionally condensed. Preferably, at least one alkylalkoxysilane of the formula VI and optionally at least one aminoalkylalkoxysilane of the formula IV, optionally at least one epoxy alkoxysilane or ether alkoxysilane of the general formula VII and optionally at least one organofunctional alkoxysilane of the formula VIII and/or condensation products thereof are then added successively or as a mixture. The hydrolysis in this case is effected under alkaline conditions, the pH preferably being below 12.

The silanes of the general formula IX, II, IV, VI, VII or VIII and/or products derived therefrom, such as hydrolysis and/or condensation products, such as cocondensation products, can be added successively or as a mixture. It is likewise possible to add the silanes of the general Formulae IX, II, IV, VI, VII and/or VIII and/or condensation products thereof in aqueous and/or alcohol solution. If required, at least one inorganic filler, such as titanium dioxide, silicon dioxide, silica sols, an Aerosil dispersion or alumina, can be added during the process. If no acid is added before or during the hydrolysis, the pH can become alkaline, and may especially be below 12. The reaction can be performed at 30-100° C., preferably in the range from 55 to 80° C. After the hydrolysis and any condensation, the pH can be adjusted to a value in the range from 1.0 to 7.0. This is done by adding an acid.

In all processes, the solvent and the alcohol formed in the reaction can be removed from the reaction mixture by distillation. The distillative removal of the solvent and/or of the alcohol is preferably performed under reduced pressure. The distillative removal is preferably performed until a temperature corresponding to the boiling temperature of water has been attained in the top of the column. If it has not been possible to essentially completely remove the alcohol and/or the solvent, water is added again and a solvent/water or alcohol/water mixture continues to be removed, especially by distillation. This procedure is repeated until the alcohol has essentially been removed.

The resulting composition is essentially solvent-free according to the above definition.

The invention also provides for the use of an inventive composition in mixtures with further silane-based compositions; the mixture especially comprises a composition containing trisamino-functional silicon compounds together with a silane-based composition based on alkyl-, alkenyl-, aryl-, epoxy-, dihydroxyalkyl-, bisaminoalkyl-, aminoalkyl-, polyalkylglycolalkyl-, haloalkyl-, mercaptoalkyl-, sulphanealkyl-, ureidoalkyl-, acryloyloxyalkyl-functional and/or tetraalkoxy-functional silanes and/or mixtures thereof. More particularly, the addition of the inventive composition in a mixture with a further silane lowers the curing temperature, while preferably maintaining or improving the repellent properties of the further silane.

The invention thus provides for the use of an inventive composition or of a mixture for hydrophobization, as corrosion protection, as an adhesion promoter, as a primer, for rock consolidation, for production of barrier layers and/or oleophobization of substrates surfaces. The use may also extend to the cured compositions or mixtures forming a layer which allows easier demoulding of casts. Thus, the invention also provides for use as a demoulding aid.

It is likewise possible to use inventive compositions or corresponding mixtures for production of biocidal, fungicidal and/or virucidal coatings.

The inventive compositions and/or mixtures can be used for hydrophobization of substrate surfaces or substrates, for example having free hydroxyl functions. The crosslinking with the hydroxyl functions and/or possible complexation and/or reaction of the amino functions achieves a high strength of the layer applied on the substrate surfaces. In general, the compositions and/or mixtures can be used for treatment or modification of substrates and/or substrate surfaces, especially for formation of barrier layers on substrate surfaces and/or for rock consolidation. Preferably, the composition(s) or mixtures are used for hydrophobization of metal surfaces or pretreated metal surfaces (chromited, chromated, Zn phosphated, phosphated, eloxed), for example zinc, stainless steel, aluminium, steel, titanium, magnesium, alloys, of glass surfaces, organic materials, such as plastic surfaces, or especially of natural fibres, for example paper, cardboard, cotton or wood, of mineral surfaces, such as concrete, bricks, sandstone, gypsum, and further inorganic surfaces. If the compositions are based on silicon compounds containing fluorosilanes, in the form of cocondensates or in the mixture, it is also possible to achieve oleophobic and anti-graffiti properties or anti-fingerprint properties. Further fields of use are in the priming of surfaces of glass, metal, mineral surfaces such as concrete, mortar, screed or sandstone, porcelain, asphalt, for coating of pipes such as stone pipes, for sealing of floors, for coating of casting moulds, especially for inner coating and easier demouldability, or organic materials, especially of natural fibres, for example paper, cardboard, cotton or wood. For example, the priming of metal surfaces can achieve improved adhesion and hence better corrosion protection, among other features. Examples of treated or modified surfaces are electronic components, chassis parts of motor vehicles, and further suitable substrates known to those skilled in the art.

The priming of, for example, metallic surfaces can achieve better adhesion of the top layer and hence also better corrosion protection, among other features. In addition, the composition mixtures can also be used for priming or sealing, or as a barrier layer of treated metal surfaces. It is possible to treat or modify phosphated, chromited, chromated or else other pretreated metal surfaces. In addition, surfaces thus treated can advantageously be coated with powder coating materials, 2K liquid coating materials or 1K liquid coating materials.

Illustrative but non-exclusive treated or modified glasses include facade parts made of glass, windows, automobile windows, glass fibres, optical glasses, lenses. In addition, inventive compositions can advantageously also be used as a component for liquid coating materials or powder coating materials, or as constituents in a liquid coating material or powder coating material.

The inventive compositions and/or mixtures can be applied or introduced to the substrates by rolling, painting, spraying, extruding, kneading, mixing, stirring or further methods familiar to those skilled in the art.

In addition, the aqueous compositions can be used for rock consolidation in mineral oil production, for example in the production of precast concrete and/or mortar components, such as pipes etc., or in aqueous coating material or resin formulations or coating material dispersions or generally in dispersions. For instance, the aqueous composition can also be applied as an additive in mortars, screed, or else to the set products for sealing of the surface. In a further possible use, the product properties of the inventive compositions can be modified further, especially by addition of additives and/or fillers. For example, by adding a wetting aid, improved distribution on a surface can be achieved. By addition of catalysts, for example zirconium n-propoxide, or a modification of the pH, the curing of the finished composition can be accelerated.

The invention also provides for the use of a composition or mixture as a sol-gel system or as an essentially sol-gel free system for production of at least one partial layer, preferably a continuous layer or coating, especially a cured layer, on an organic and/or inorganic substrate and/or organic-inorganic composite material for protection from corrosion and/or UV radiation.

The invention also provides coatings on substrates or on substrate surfaces, such as metallic surfaces or surfaces of alloys, especially on chromated, phosphated or chromited metallic surfaces, by curing a composition or mixture with a substrate or on a substrate according to any one of claims 1 to 14.

The invention also provides coated or consolidated products which are obtainable by using and especially curing the composition and/or mixtures according to any one of claims 1 to 14 with a substrate or on a substrate.

Substrates here include especially—but not exclusively: coated glasses such as silicate-based glasses, for example automobile windows, lenses, laboratory glassware, etc., or coated acrylic glass, corrosion-protected metals, alloys or corrosion-protected mineral substrates, such as set concrete or mortar, or the organic materials mentioned, especially products composed of treated or coated natural fibres. Examples thereof are the reinforcements treated with the composition, which are coated with the composition before they are used in concrete. In addition, it is also possible to mix, process and then set an as yet unset concrete mixture with an inventive composition. In this case, it should be ensured that the composition remains processable, for example by selection of the correct pH or other parameters. In this way, it is possible to obtain, for example, hydrophobic, corrosion-resistant concrete or products made of concrete, such as drainpipes or precast components for buildings. The concrete thus treated has considerably better corrosion resistance to environmental influences.

The invention is illustrated in detail by the examples which follow.

EXAMPLES

Analytical Tests

Residue:

The solids content of the aqueous silane systems is determined as follows: 1 g of the sample is weighed into a small porcelain dish and dried to constant weight in a drying cabinet at 105° C.

$SiO_2$ Content:

1.0 to 5.0 g of the sample are mixed in a 400 ml beaker with a Kjeldahl tablet and 20 ml of sulphuric acid, and first heated slowly. In the course of this, the beaker is covered with a watch glass. The temperature is increased until the sulphuric acid fumes vigorously and all organic constituents have been destroyed and the solution remains clear and light-coloured. The cold digestion solution is diluted to approx. 200 ml with dist. water and boiled briefly (water at the edge of the beaker allowed to flow under the acid). The residue is filtered through a white band filter and washed with hot water until the wash water displays a pH of >4 (pH paper). The filter is dried in a platinum crucible, converted to ash and calcined in a muffle furnace at 800° C. for one hour. After weighing, the residue is fumed off with hydrofluoric acid, the crucible is calcined by means of a fan burner and if appropriate calcined once again at 800° C., cooled and then weighed. The difference between the two weights corresponds to the $SiO_2$ content.

Evaluation: $D \times 100/E = \%$ by weight of $SiO_2$
D=difference in weight before and after hydrofluoric acid removal of silicon as volatile silicon tetrafluoride in mg
100=conversion to %
E=starting weight in mg Determination of Free Methanol and Ethanol Contents:

The alcohol determination was conducted by means of GC.
Column: RTX 200 (60 m)
Temperature programme: 90-10-25-240-0
Detector: FID
Amount injected: 1.0 µl
Internal standard: 2-butanol
Silanes and Silane Systems Used:

| Trade name | Product description | Manufacturer |
| --- | --- | --- |
| Dynasylan ® Hydrosil 2926 | aqueous epoxy-functional siloxane oligomer, alcohol-free | Evonik Degussa |
| Dynasylan ® F 8261 | tridecafluorooctyltriethoxysilane | Evonik Degussa |
| Dynasylan ® SIVO 110 | aqueous silane formulation VOC-free | Evonik Degussa |
| Dynasylan ® 1124 | bis[trimethoxysilylpropyl]amine (bis-AMMO) | Evonik Degussa |
| Dynasylan ® 1122 | bis[triethoxysilylpropyl]amine (bis-AMEO) | Evonik Degussa |
| Dynasylan ® MTES | methyltriethoxysilane | Evonik Degussa |
| Dynasylan ® F 8815 | aqueous fluoroalkyl-functional hydro-/oleophobic coating material | Evonik Degussa |
| TYZOR NPZ | zirconium n-propoxide | Du Pont |
| Levasil 100S/45% | aqueous silica sol, particle size 100 nm, pH = 4; conc. 45% | H.C. Starck GmbH |
| Dynasylan ® AMMO | 3-aminopropyltrimethoxysilane | Evonik Degussa |
| Dynasylan ® AMEO | 3-aminopropyltriethoxysilane | Evonik Degussa |
| Dynasylan ® GLYMO | 3-glycidyloxypropyltrimethoxysilane | Evonik Degussa |
| Dynasylan ® PTMO | propyltrimethoxysilane | Evonik Degussa |
| Dynasylan ® VTMO | Vinyltrimethoxysilane N-formyl-3-amino-propyltriethoxysilane (triethoxysilylpropylformamide) tris[trimethoxysilylpropyl]amine (tris-AMMO) | Evonik Degussa |

Synthesis Example 1

A 1 l stirred apparatus with metering device and reflux condenser was initially charged with 400.0 g of water, 3.5 g of formic acid (conc. of HCOOH 85%). The solution was heated to 60° C. 32.0 g of tris-AMMO were metered in through the metering device. The pH was supposed to be approx. 4.3. The mixture was stirred at 60° C. for 90 minutes (metering time included). This was followed by stirring at 65° C. for 1 hour and then 35.5 g of an alcohol/water mixture were distilled off at 130 to 200 mbar. The final weight of the residue was 400 g. The product was filtered through a Seitz T-900 filter plate at room temperature.

The resulting solution was clear and slightly reddish.

Analysis for Example 1

Dry residue: 6.6% (w/w)
$SiO_2$ content: 5.5% (w/w)
Free methanol: 0.3%

Synthesis Example 2

A 1 l stirred apparatus with metering device and reflux condenser was initially charged with 400.0 g of water, 4.8 g of formic acid (conc. of HCOOH 85%). The solution was heated to 60° C. 32.0 g of a mixture of 16.0 g of bis-AMMO and 16.0 g of tris-AMMO were metered in through the metering device. The pH was supposed to be approx. 4.3. The mixture was stirred at 60° C. for 90 minutes (metering time included). This was followed by stirring at 65° C. for 1 hour. 36.8 g of an alcohol/water mixture were distilled off at 130 to 200 mbar. The final weight of the residue was 400 g. The product was filtered through a Seitz T-950 filter plate at room temperature. The result was a clear orange-reddish liquid.

Analysis for Example 2

Dry residue: 5.7% (w/w)
$SiO_2$ content: 2.8% (w/w)
Free methanol: 0.2%

Synthesis Example 3

A 1 l stirred apparatus with metering device and reflux condenser was initially charged with 400.0 g of water, 3.5 g of formic acid (conc. of HCOOH 85%). The solution was heated to 60° C. 32.0 g of tris-AMMO were metered in through the metering device. The pH was supposed to be approx. 4.3. The mixture was stirred at 60° C. for 60 minutes, including the metering time. Subsequently, 12 g of PTMO were metered in. The mixture was stirred at 65° C. for a further 90 minutes. Subsequently, 47.5 g of an alcohol/water mixture were distilled off at 130 to 200 mbar. The product obtained was filtered through a Seitz T-900 filter plate to obtain a clear, slightly reddish liquid.

Analysis for Example 3

Dry residue: 7.2% (w/w)
$SiO_2$ content: 3.5% (w/w)
Free methanol: 1.1%

Use Examples

1. Methods 1.1 Coating of Sandblasted Glass Panes

It should be ensured that the surfaces are cleaned before the application and are in particular free of grease. Pretreatment of the glass surface (size of the glass panes 0.07 m×0.15 m): the glass panes are degreased by immersing them into a 1% Ridoline C-72 solution at 60° C. for 5 minutes, then rinsing under flowing demineralised water, immersing briefly into a 0.2% $H_2SO_4$ solution and rinsing thoroughly with demineralised water. The glass surface was subsequently dried with a paper towel.

The systems from the examples were applied with an impregnated paper towel by wiping on the sandblasted surface. The resulting coatings were subsequently cured at room temperature for at least 12 hours.

1.2 Measurement of the Static Contact Angle

The static contact angle was determined by a multiple measurement with the KRÜSS G-15 contact angle measuring instrument on the basis of DIN EN 828.

To test the hydrophobic properties, the static contact angle (CA) was measured with demineralised water.

1.3 Determination of the Wash and Scrub Resistance Based on DIN 53778:

The coated glass panes were tested on the basis of DIN 53778 with the ERICHSEN washability and scrub resistance tester, model 494, with isopropanol as the wash solution.

1.4 Testing of UV Stability on the Basis of DIN EN ISO 4892-3:

The instrument used for rapid weathering (QUV-se) is from Q-Panel and meets the requirements of DIN EN ISO 4892-3. The radiation intensity on the surface of the glass panes is 0.92 W/m² at 340 nm.

A weathering cycle lasts a total of 8 hours:
4 hours of irradiation cycle at 60° C., then
3 hours 55 minutes of condensed water cycle at 45° C. and
5 minutes of rain cycle After 161 h, 638 h and 1595 hours, the static contact angle was determined with demineralised water according to 1.2.

Use Example 1.5

12.5 g of the product from Synthesis Example 1 were mixed with 0.5 g of the aqueous product Dynasylan® F 8815. The mixture was applied with a soaked paper towel to a cleaned sandblasted glass pane (size=8×15 cm). The resulting coatings were dried at room temperature for 2 days.

Use Example 1.6

15.0 g of the product from Synthesis Example 1 were mixed with 3.0 g of the aqueous product Dynasylan® F 8815. The mixture was applied with a soaked paper towel to a cleaned sandblasted glass pane (size=8×15 cm). The resulting coatings were dried at room temperature for 2 days.

TABLE 1

Results of the wash and scrub resistance based on DIN 53778

| Use Example | CA H$_2$O [°] | 1000 cycles | 2000 cycles |
|---|---|---|---|
| 1.5 | 128 | 127 | 120 |
| 1.6 | 136 | 135 | 127 |

TABLE 2

Results of UV resistance

| Use Example | 0 h (unirradiated) | 161 h | 638 h | 1595 h |
|---|---|---|---|---|
| 1.5 | 128 | 102 | 91 | 68 |
| 1.6 | 135 | 124 | 125 | 129 |

The contact angles show outstanding hydrophobic properties of these coatings after abrasion and UV irradiation. The test was therefore passed.

2. Coating of the Ground Stainless Steel Plates 2.1 Description of the Stainless Steel Plates Used:

Steel sheets according to A.F.E.R.A. 4001 made of 1.4301 alloy, roughened longitudinally to Ra 0.05-0.4μ, Rz<4μ. Size=200×50×2 mm, source: Rocholl GmbH.

2.2 Cleaning of the Stainless Steel Plates:

10.0 g of Ridoline C-72 were mixed with demineralised water and heated to 60° C. While stirring, the stainless steel strips were immersed for 30 seconds, then rinsed under flowing demineralised water and immersed briefly into a 0.2% H$_2$SO$_4$ solution, rinsed with demineralised water, then dried with a paper towel.

2.3 Assessment of the Coated Stainless Steel Surfaces after Stress Tests

Visual assessment of the coating after the application of dist. water, vinegar detergent (Frosch vinegar detergent), mustard (Löwensenf, extra hot) and an oven cleaner (Sidol oven and grill cleaner). For this purpose, the substrate is covered with the test media on a round area of about 3 cm in size. After one hour, the water test medium is rinsed off and the substrate surface is assessed visually.

(−)=Layer destroyed or detached (0)=Layer present, but attacked slightly (+)=Layer unchanged 2.3. Coating of the Stainless Steel Surface:

Three quarters of a longitudinally roughened stainless steel surface was coated with the formulation. One plate in each case was coated by wiping. The coating was effected with a cotton cloth soaked in the formulation, by spreading the formulation onto the stainless steel surface. Curing was effected at room temperature.

TABLE 3

Results of the pencil hardness test and of the boiling stability of selected synthesis examples of the transparent homogeneous coatings on longitudinally roughened stainless steel surfaces:

| Coating from Synthesis Example | Boiling test | Pencil hardness | 1 h test HAc detergent | 1 h H$_2$O at Rt | 1 h Mustard | 1 h Oven cleaner |
|---|---|---|---|---|---|---|
| 1 | | | + | + | + | + |
| 2 | | | + | + | + | + |

Assessment:

Visual Assessment of the Coating after the Vinegar Detergent and Water Test (−)=Layer destroyed or detached (0)=Layer present, but attacked slightly (+)=Layer unchanged Use Example 2.4

12.5 g of the product from Synthesis Example 1 were mixed with 0.5 g of the aqueous product Dynasylan® F 8815. The mixture was applied with a soaked paper towel to a cleaned, longitudinally roughened stainless steel surface (size=8200×50×2 mm). The resulting coatings were dried at room temperature for 2 days.

Use Example 2.5

12.5 g of the product from Example 2 were mixed with 0.5 g of the aqueous product Dynasylan® F 8815. The mixture was applied with a soaked paper towel to a cleaned, longitudinally roughened stainless steel surface (size=8200×50×2 mm). The resulting coatings were dried at room temperature for 2 days.

TABLE 4

Results of the pencil hardness test and of the boiling resistance of selected examples of the transparent homogeneous coatings on ground stainless steel surfaces:

| Use Example | Boiling test | Pencil hardness | 1 h test HAc detergent | 1 h H$_2$O at Rt | 1 h Mustard | 1 h Oven cleaner |
|---|---|---|---|---|---|---|
| 2.4 | | | + | + | + | + |
| 2.5 | | | + | + | + | + |

Assessment:

Visual assessment of the coating after the application of dist. water, vinegar detergent (Frosch vinegar detergent), mustard (Löwensenf, extra hot) and an oven cleaner (Sidol oven and grill cleaner). For this purpose, the substrate is covered with the test media on a round area of about 3 cm in size. After one hour, the water test medium is rinsed off and the substrate surface is assessed visually.

(−)=Layer destroyed or detached
(0)=Layer present, but attacked slightly
(+)=Layer unchanged

3. Decrease in the Crosslinking Temperature of a Dynasylan® SIVO 110/SIVO 112 Blend on a Around Stainless Steel Surface

Use Example 3.1

20.0 g of the product from Synthesis Example 1 were mixed with 10.0 g of the aqueous product Dynasylan® SIVO 112, 10.0 g of Dynasylan® SIVO 110 and 40.0 g of demineralised water. The mixture was applied with a soaked paper towel to a cleaned ground stainless steel surface (size=8200×50×2 mm). The resulting coatings were dried at 120° C. for 10 minutes.

Comparative Example 3.2

10.0 g of Dynasylan® SIVO 110 were mixed with 10.0 g of the aqueous product Dynasylan® SIVO 112 and 20.0 g of demineralised water. The mixture was applied to a cleaned ground stainless steel surface with a soaked paper towel (size=8200×50×2 mm). The resulting coating was dried at 120° C. for 10 minutes.

Comparative Example 3.3

10.0 g of Dynasylan® SIVO 110 were mixed with 10.0 g of the aqueous product Dynasylan® SIVO 112 and 20.0 g of demineralised water. The mixture was applied to a cleaned ground stainless steel surface with a soaked paper towel (size=8200×50×2 mm). The resulting coating was dried at 220° C. for 10 minutes.

TABLE 5

| Formulation: | Boiling test | Pencil hardness | 1 h test HAc detergent | 1 h H$_2$O at Rt | 1 h Mustard | 1 h Oven cleaner |
|---|---|---|---|---|---|---|
| Use Example 3.1 | | | + | + | + | + |
| Comparative Example 3.2 | | | − | + | − | − |
| Comparative Example 3.3 | | | − | + | − | − |

Visual Assessment of the Coating after the Vinegar Detergent and Water Test (−)=Layer destroyed or detached
(0)=Layer present, but attacked slightly
(+)=Layer unchanged

The invention claimed is:

1. A composition, comprising a water-soluble, tris-silylated amino-functional silicon-containing compound and water, wherein
the a silicon-containing compound comprises crosslinking structural elements which form catenated, cyclic, crosslinked and/or three-dimensionally crosslinked structures,
at least one structure consists of formula (I), $$(R^1O)[(R^1O)_{1-x}(R^3)_xSi(B)O]_b[Si(C)(R^5)_y(OR^1)_{1-y}O]_c$$
$$[(Y)_{2-\Delta}(R^{11})_\Delta Si(A)Si(R^{11})_\Delta(Y)_{2-\Delta}O]_a$$

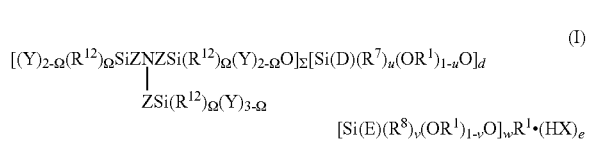

$$[Si(E)(R^8)_v(OR^1)_{1-v}O]_w R^1 \cdot (HX)_e \quad (I)$$

wherein
A is a bivalent aminoalkyl radical,
B is an aminoalkyl radical,
C is an alkyl radical,
D is an epoxy or ether radical,
E is an organofunctional radical,
Z is independently a bivalent alkylene radical,
Y is OR$^1$ or, in crosslinked and/or three-dimensionally crosslinked structures, is independently OR$^1$ or O$_{1/2}$,
R$^1$ is independently hydrogen or a linear, cyclic and/or branched alkyl radical having 1 to 24 carbon atoms,
R$^3$, R$^5$, R$^7$, R$^8$, R$^{11}$ and/or R$^{12}$ are each independently organofunctional radicals,
HX is an acid wherein X is an inorganic or organic acid radical,
$0 \leq \Delta \leq 2$,
$0 \leq \Omega \leq 2$,
$0 \leq x \leq 1$,
$0 \leq y \leq 1$,
$0 \leq u \leq 1$,
$0 \leq v \leq 1$, a≥0, b≥0, c≥1, d≥0, w≥0, Σ≥1, e≥0 and (a+b+c+d+w+Σ+e)≥2, and
the composition contains at most 5% by weight of organic solvents.

2. The composition of claim 1, wherein:
A is derived from formula (II)

$$(OR^1)_{3-\Delta}(R^{11})_\Delta Si\text{-}A\text{-}Si(R^{11})_\Delta(OR^1)_{3-\Delta} \quad (II)$$

wherein
A is a bivalent amino-functional group of the formula (III)

$$-Z^*-[NH(CH_2)_f]_g NH[(CH_2)_{f^*}NH]_{g^*}-Z^*- \quad (III)$$

Z* is independently a bivalent alkylene radical, f, f*, g or g* are the same or different,
f and/or f*=1, 2 or 3,
g and/or g*=0, 1 or 2, and
R$^{11}$ is a linear, branched and/or cyclic alkyl radical having 1 to 24 carbon atoms or an aryl radical;
Z derived from formula (IX)

$$N[ZSi(R^{12})_\Omega(OR^1)_{3-\Omega}]_3 \quad (IX)$$

wherein

Z is independently a bivalent alkylene radical, and
$R^{12}$ is a linear, branched and/or cyclic alkyl radical having 1 to 24 carbon atoms or an aryl radical, and
Ω is, independently, 0 or 1;
B derived from formula (IV)

$$B-Si(R^3)_x(OR^1)_{3-x} \qquad (IV)$$

wherein x=0 or 1,
$R^3$ is a linear, branched or cyclic alkyl radical having 1 to 24 carbon atoms and/or an aryl radical, and
B is one of the following amino-functional groups of formula (Va) or (Vb)

$$R^{10}{}_{h*}NH_{(2-h*)}[(CH_2)_h(NH)]_j[(CH_2)_l(NH)]_n \\ -(CH_2)_k- \qquad (Va)$$

wherein

0≤h≤6,
h*=0, 1 or 2,
j=0, 1 or 2,
0≤l≤6;
n=0, 1 or 2,
0≤k≤6, and
$R^{10}$ is a benzyl, aryl, vinyl, formyl radical and/or a linear, branched and/or cyclic alkyl radical having 1 to 8 carbon atoms, $$[NH_2(CH_2)_m]_2N(CH_2)_p- \qquad (Vb)$$

wherein

0≤m≤6 and 0≤p≤6;
C derived from formula (VI)

$$C-Si(R^5)_y(OR^1)_{3-y} \qquad (VI)$$

wherein y=0 or 1,
C is a linear, branched or cyclic alkyl radical having 1 to 20 carbon atoms, and
$R^5$ is a linear, branched or cyclic alkyl radical having 1 to 24 carbon atoms and/or an aryl radical;
D is derived from formula (VII)

$$D-Si(R^7)_u(OR^1)_{3-u} \qquad (VII)$$

wherein u=0 or 1,
D is a 3-glycidoxyalkyl, 3-glycidoxypropyl, epoxyalkyl, epoxycycloalkyl, polyalkylglycolalkyl radical or a polyalkylglycol-3-propyl radical,
$R^7$ is a linear, branched and/or cyclic alkyl radical, having 1 to 24 carbon atoms, or an aryl radical;
E is derived from formula (VIII)

$$E-Si(R^8)_v(OR^1)_{3-v} \qquad (VIII)$$

wherein v=0 or 1,
$R^8$ is a linear, branched or cyclic alkyl radical having 1 to 4 carbon atoms,
E is at least one selected from the group consisting of an $R^{8*}-Y_m-(CH_2)_s-$ radical, wherein $R^{8*}$ is a mono-, oligo- or perfluorinated alkyl radical having 1 to 9 carbon atoms or a mono-, oligo- or perfluorinated aryl radical, Y is a $CH_2$, O, aryl or S radical, m=0 or 1, and s=0 or 2, and a vinyl, allyl, isopropenyl radical, mercaptoalkyl radical, sulphanealkyl radical, ureidoalkyl radical, an acryloyloxyalkyl radical or a linear, branched or cyclic alkoxy radical having 1 to 24 carbon atoms; and $R^1$ in the Formulae II, IX, IV, VI, VII and/or VIII is in each case independently a linear, cyclic and/or branched alkyl radical having 1 to 24 carbon atoms.

3. The composition of claim 2, wherein Z* is —$CH_2$—, —$(CH_2)_2$—, —$(CH_2)_3$—, or —$[CH_2CH(CH_3)CH_2]$—.

4. The composition of claim 2, wherein Z is independently —$CH_2$—, —$(CH_2)_2$—, —$(CH_2)_3$—, or —$[CH_2CH(CH_3)CH_2]$—.

5. The composition of claim 1, which has a pH in the range from 1 to 12.

6. The composition of claim 1, wherein the acid is at least one selected from the group consisting of formic acid, acetic acid, citric acid, an acidic silica sol, glacial acetic acid, nitric acid, sulfuric acid and phosphoric acid.

7. A coating obtained by curing the composition of claim 1 with a substrate or on a substrate surface.

8. A coated or consolidated product obtained by curing the composition of claim 1 with a substrate or on a substrate surface.

9. A process for preparing a composition, comprising hydrolysing in the presence of water at least one selected from the group consisting of:

at least one tris-silylated aminoalkoxysilane of formula (IX)

$$N[ZSi(R^{12})_\Omega(OR^1)_{3-\Omega}]_3 \qquad (IX)$$

wherein

Z is independently a bivalent alkylene radical, $R^{12}$ is a linear, branched or cyclic alkyl radical having 1 to 24 carbon atoms, and Ω is independently 0 or 1;
at least one bisaminoalkoxysilane of formula (II)

$$(OR^1)_{3-\Delta}(R^{11})_\Delta Si-A-Si(R^{11})_\Delta(OR^1)_{3-\Delta} \qquad (II)$$

wherein

A is a bisamino-functional group of formula (III)

$$-(CH_2)_i-[NH(CH_2)_f]_gNH[(CH_2)_{f*}NH]_{g*} \\ -(CH_2)_{i*}- \qquad (III)$$

i, i*, f, g and g* are the same or different,
i and/or i*=0 to 8,
f and/or f*=1, 2 or 3,
g and/or g*=0, 1 or 2,
$R^{11}$ is a linear, branched or cyclic alkyl radical having 1 to 24 carbon atoms or an aryl radical,
Δ=0 or 1;
at least one aminoalkylalkoxysilane of formula (IV)

$$B-Si(R^3)_x(OR^1)_{3-x} \qquad (IV)$$

wherein x=0 or 1,
$R^3$ is a linear, branched and/or cyclic alkyl radical having 1 to 24 carbon atoms,
B is one of the amino-functional groups of formula Va or Vb $$R^{10}{}_{h*}NH_{(2-h*)}[(CH_2)_h(NH)]_j[(CH_2)_l(NH)]_n \\ -(CH_2)_k- \qquad (Va)$$

wherein

0≤h≤6,
h*=0, 1 or 2,
j=0, 1 or 2,
0≤l≤6,
n=0, 1 or 2,
0≤k≤6, and
$R^{10}$ is a benzyl, aryl, vinyl, formyl radical and/or a linear, branched and/or cyclic alkyl radical having 1 to 8 carbon atoms, or $$[NH_2(CH_2)_m]_2N(CH_2)_p- \qquad (Vb)$$

wherein
0≤m≤6, and
0≤p≤6;
at least one alkylalkoxysilane of formula (VI)

$$C-Si(R^5)_y(OR^1)_{3-y} \quad (VI)$$

wherein
y=0 or 1,
C is a linear, branched or cyclic alkyl radical having 1 to 20 carbon atoms,
$R^5$ is independently a linear, branched or cyclic alkyl radical having 1 to 24 carbon atoms or an aryl radical; at least one epoxy or ether alkoxysilane of the formula (VII)

$$D-Si(R^7)_u(OR^1)_{3-u} \quad (VII)$$

wherein
u=0 or 1,
D is a 3-glycidoxyalkyl, 3-glycidoxypropyl, epoxyalkyl, epoxycycloalkyl, polyalkylglycolalkyl or a polyalkylglycol-3-propyl radical,
$R^7$ is a linear, branched or cyclic alkyl radical having 1 to 24 carbon atoms or an aryl radical;
at least one organofunctional alkoxysilane of formula (VIII)

$$E-Si(R^8)_v(OR^1)_{3-v} \quad (VIII)$$

wherein
v=0 or 1, $R^8$ is a linear, branched or cyclic alkyl radical having 1 to 4 carbon atoms, E is an $R^{8*}-Y_m-(CH_2)_s-$ radical, $R^{8*}$ is a mono-, oligo- or perfluorinated alkyl radical having 1 to 9 carbon atoms or a mono-, oligo- or perfluorinated aryl radical, Y is a $CH_2-$, $O-$, aryl or S radical and m=0 or 1 and s=0 or 2, or a vinyl, allyl, isopropenyl radical, mercaptoalkyl radical, sulphanealkyl radical, ureidoalkyl radical, an acryloyloxyalkyl radical or a linear, branched or cyclic alkoxy radical having 1 to 24 carbon atoms; and a mixture of at least two of the abovementioned alkoxysilanes or hydrolysis and/or condensation products thereof,
wherein
$R^1$, in each case independently, in the Formulae IX, II, IV, VI, VII and/or VIII is a linear, cyclic and/or branched alkyl radical having 1 to 24 carbon atoms, and
the hydrolysis optionally occurs in the presence of an acid, and optionally with initial charging and/or addition of alcohol and/or of a catalyst, and essentially removing the alcohol,
wherein the process includes hydrolyzing at least one trissilylated amino alkylalkoxysilane of formula IX and an alkylalkoxysilane of the general formula VI.

10. The process of claim 9, wherein hydrolysis is essentially complete.

11. The process of claim 9, wherein the pH during the hydrolysis is below 12.

12. The process of claim 9, further comprising adding water and removing an alcohol/water mixture until the composition is essentially free of alcohols.

13. A composition obtained by the process of claim 9.

* * * * *